(12) United States Patent
Kimura et al.

(10) Patent No.: US 7,523,797 B2
(45) Date of Patent: Apr. 28, 2009

(54) POWER OUTPUT APPARATUS, METHOD OF CONTROLLING POWER OUTPUT APPARATUS, AND AUTOMOBILE WITH POWER OUTPUT APPARATUS MOUNTED THEREON

(75) Inventors: Akihiro Kimura, Toyota (JP); Natsuki Nozawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 239 days.

(21) Appl. No.: 10/833,100

(22) Filed: Apr. 28, 2004

(65) Prior Publication Data

US 2004/0231897 A1 Nov. 25, 2004

(30) Foreign Application Priority Data

May 21, 2003 (JP) ............................. 2003-143986
Feb. 13, 2004 (JP) ............................. 2004-036306

(51) Int. Cl.
*B60K 6/48* (2007.10)
*B60W 20/00* (2006.01)

(52) U.S. Cl. ..................................... 180/65.2; 903/941

(58) Field of Classification Search ................ 180/65.2, 180/65.3, 65.4; 903/941, 942, 943
See application file for complete search history.

(56) References Cited

U.S. PATENT DOCUMENTS

| 4,335,429 A * | 6/1982 | Kawakatsu ................. 701/102 |
| 4,405,029 A * | 9/1983 | Hunt ......................... 180/65.2 |
| 5,318,142 A * | 6/1994 | Bates et al. ................ 180/65.2 |
| 5,359,308 A * | 10/1994 | Sun et al. ..................... 335/216 |
| 5,492,100 A * | 2/1996 | Ishii et al. .................... 123/481 |
| 5,497,070 A * | 3/1996 | Furutani et al. ............... 322/23 |
| 5,713,425 A * | 2/1998 | Buschhaus et al. ......... 180/65.2 |
| 5,789,881 A * | 8/1998 | Egami et al. ................ 318/139 |
| 5,806,617 A * | 9/1998 | Yamaguchi ................. 180/65.2 |
| 5,923,093 A * | 7/1999 | Tabata et al. .............. 290/40 C |
| 6,075,346 A * | 6/2000 | Kikuchi et al. .............. 320/150 |
| 6,116,363 A * | 9/2000 | Frank ........................ 180/65.2 |
| 6,328,670 B1 * | 12/2001 | Minowa et al. ................ 477/5 |
| 6,484,833 B1 * | 11/2002 | Chhaya et al. ............. 180/65.4 |

FOREIGN PATENT DOCUMENTS

| JP | 8-317505 | 11/1996 |
| JP | 2000-110604 A | 4/2000 |
| JP | 2000-197208 | 7/2000 |
| JP | 2002-337573 | 11/2002 |
| JP | 2004-138158 | 5/2004 |

* cited by examiner

*Primary Examiner*—Frank B Vanaman
(74) *Attorney, Agent, or Firm*—Kenyon & Kenyon LLP

(57) ABSTRACT

The procedure of the invention sets a revolution speed at an efficient drive point, which is selected among drive points of an engine fulfilling a target power Pe* to be output from the engine, to a tentative revolution speed Netmp1 of the engine. The procedure also calculates a revolution speed that satisfies both a torque demand Tr* to be output to a drive shaft and a charge limit Win of a battery or an electric accumulator and sets the calculated revolution speed to a tentative revolution speed Netmp2 of the engine. The procedure sets the grater between the tentative revolution speed Netmp1 and the tentative revolution speed Netmp2 to a target revolution speed Ne* of the engine and controls the engine and two motors. This arrangement ensures output of a required braking force in response to a driver's accelerator-off action, while taking into account the charge limit of the electric accumulator.

7 Claims, 10 Drawing Sheets

POWER OUTPUT APPARATUS, METHOD OF CONTROLLING POWER OUTPUT APPARATUS, AND AUTOMOBILE WITH POWER OUTPUT APPARATUS MOUNTED THEREON

BACKGROUND OF THE INVENTION

1. Field of the Invention

The present invention relates to a power output apparatus, a method of controlling the same, and an automobile with the power output apparatus mounted thereon. More specifically the invention pertains to a power output apparatus that outputs power to a drive shaft, as well as to a method of controlling such a power output apparatus and an automobile with such a power output apparatus mounted thereon.

2. Description of the Prior Art

A proposed power output apparatus has an engine, a planetary gear mechanism that includes a carrier connected with a crankshaft of the engine and a ring gear connected with a drive shaft, which is mechanically linked with an axle, a first motor that outputs power to a sun gear of the planetary gear mechanism, a second motor that inputs and outputs power from and to the drive shaft, and a battery that transmits electric power to and from the first motor and the second motor (for example, see Patent Laid-Open Gazette No. 2000-197208). In response to a driver's accelerator-off action to require a braking force to the drive shaft, this known power output apparatus carries out regenerative control of the second motor corresponding to the requirement of the braking force, so as to charge the battery with regenerative energy, while outputting the required braking force to the drive shaft by regenerative braking control.

In the prior art power output apparatus, when the regenerative energy generated in the process of applying the required braking force to the drive shaft by regenerative braking control of the second motor exceeds an allowable charge limit of the battery, the second motor can output only the braking force corresponding to the electric power satisfying the charge limit of the battery. This may fail to output the required braking force to the drive shaft and deteriorate the drivability.

SUMMARY OF THE INVENTION

A power output apparatus of the invention and a corresponding method of controlling the power output apparatus aim to ensure output of a required braking force in response to a driver's accelerator-off action and thereby prevent deterioration of drivability, while preventing an electric accumulator, such as a battery, from being excessively charged. An automobile of the invention also aims to ensure output of a required braking force in response to a driver's accelerator-off action and thereby prevent deterioration of drivability, while preventing an electric accumulator, such as a battery, from being excessively charged.

In order to attain at least a part of the aforementioned objects, a power output apparatus, a method of controlling the same, and an automobile with the power output apparatus mounted thereon are constructed as follows.

A first power output apparatus of the present invention outputs power to a drive shaft and includes: an internal combustion engine; an electric power-dynamic power input-output module that transmits at least part of power from the internal combustion engine to the drive shaft through input and output of electric power and dynamic power; a motor that inputs and outputs power from and to the drive shaft; an electric accumulator that transmits electric power to and from the electric power-dynamic power input-output module and the motor; and a controller that, in response to a driver's accelerator-off action to require a braking force to the drive shaft, sets a specific drive point of the internal combustion engine to attain output of a braking force corresponding to the requirement of the braking force to the drive shaft, based on the requirement of the braking force and a charge limit of the electric accumulator, and controls the internal combustion engine, the electric power-dynamic power input-output module, and the motor to drive the internal combustion engine at the preset specific drive point and to ensure output of the braking force corresponding to the requirement of the braking force to the drive shaft.

The first power output apparatus of the invention sets the specific drive point of the internal combustion engine to attain output of a braking force, which is corresponding to the requirement of the braking force to the drive shaft in response to the driver's accelerator-off action, to the drive shaft, based on the requirement of the braking force and the charge limit of the electric accumulator. The first power output apparatus controls the internal combustion engine, the electric power-dynamic power input-output module, and the motor to drive the internal combustion engine at the preset specific drive point and to ensure output of the braking force corresponding to the requirement of the braking force to the drive shaft. Here the electric power-dynamic power input-output module transmits at least part of power from the internal combustion engine to the drive shaft through input and output of electric power and dynamic power, and the motor inputs and outputs power from and to the drive shaft. This arrangement sets the specific drive point of the internal combustion engine to output the required braking force by taking into account the requirement of the braking force in response to the driver's accelerator-off action and the charge limit of the electric accumulator. The first power output apparatus of the invention thus ensures output of the required braking force to the drive shaft, while satisfying the charge limit of the electric accumulator.

As one application of the first power output apparatus of the invention, the controller may set a revolution speed calculated from a first driving force, which is transmitted to the drive shaft through input and output of power into and from the electric power-dynamic power input-output module, to a target revolution speed at the specific drive point of the internal combustion engine, where the first driving force is obtained according to a specific relation that a sum of the first driving force and a second driving force, which is output from the motor to the drive shaft, is equal to the requirement of the braking force and according to another specific relation that a sum of a first electric power input into and output from the electric power-dynamic power input-output module and a second electric power input into and output from the motor is equal to the charge limit of the electric accumulator. This arrangement sets the drive point of the internal combustion engine that satisfies both the requirement of the braking force to the drive shaft and the charge limit of the electric accumulator. In this case, the controller may substitute a power input from and output to the electric power-dynamic power input-output module, which is calculated from the first driving force, into a target power of a relational expression, reversely calculate the relational expression to specify a revolution speed, and set the specified revolution speed to the target revolution speed at the specific drive point of the internal combustion engine, where the relational expression determines a target power to be input from and output to the electric power-dynamic power input-output module in feedback control of the electric power-dynamic power input-output module with the setting of the target revolution speed of the internal combustion engine.

A second power output apparatus of the invention includes: an internal combustion engine; an electric power-dynamic power input-output module that transmits at least part of power from the internal combustion engine to the drive shaft through input and output of electric power and dynamic power; a motor that inputs and outputs power from and to the drive shaft; an electric accumulator that transmits electric power to and from the electric power-dynamic power input-output module and the motor; and a controller that, in response to a driver's accelerator-off action to require a braking force to the drive shaft, sets a limit braking force as a restriction to the requirement of the braking force by taking into account an increase limit imposed on an increase in revolution speed of the internal combustion engine by input and output of power from and to the electric power-dynamic power input-output module and a charge limit of the electric accumulator, and controls the internal combustion engine, the electric power-dynamic power input-output module, and the motor to ensure output of a braking force corresponding to the requirement of the braking force to the drive shaft under restriction of the setting of the limit braking force.

In response to the driver's accelerator-off action to require a braking force to the drive shaft, the power output apparatus of the second embodiment sets the limit braking force as the restriction to the requirement of the braking force by taking into account the increase limit imposed on an increase in revolution speed of the internal combustion engine by input and output of power from and to the electric power-dynamic power input-output module and the charge limit of the electric accumulator. The second power output apparatus controls the internal combustion engine, the electric power-dynamic power input-output module, and the motor to ensure output of a braking force corresponding to the requirement of the braking force to the drive shaft under restriction of the setting of the limit braking force. Here the electric power-dynamic power input-output module transmits at least part of power from the internal combustion engine to the drive shaft through input and output of electric power and dynamic power, and the motor inputs and outputs power from and to the drive shaft. This arrangement sets the restriction to the requirement of the braking force in response to the driver's accelerator-off action, according to the charge limit of the electric accumulator and the increase limit imposed on the increase in revolution speed of the internal combustion engine through input and output of power from and to the electric power-dynamic power input-output module. The second power output apparatus of the invention thus ensures output of the required braking force to the drive shaft, while satisfying the increase limit imposed on the increase in revolution speed of the internal combustion engine and the charge limit of the electric accumulator.

As one application of the second power output apparatus of the invention, the controller may calculate a power input from and output to the electric power-dynamic power input-output module to make a revolution speed of the internal combustion engine equal to the increase limit imposed on the increase in revolution speed of the internal combustion engine, set an output restriction of the motor by taking into account the calculated power input from and output to the electric power-dynamic power input-output module and the charge limit of the electric accumulator, and set the limit braking force, based on the calculated power input from and output to the electric power-dynamic power input-output module and the setting of the output restriction of the motor. This arrangement enables the braking force to be output to the drive shaft in response to the driver's accelerator-off action under restriction of the increase limit imposed on the increase in revolution speed of the internal combustion engine and the charge limit of the electric accumulator. In this case, the controller may sum up a driving force transmitted from the electric power-dynamic power input-output module to the drive shaft corresponding to the calculated power input from and output to the electric power-dynamic power input-output module and a driving force output from the motor to the drive shaft corresponding to the setting of the output restriction, so as to set the limit braking force.

A third power output apparatus of the present invention outputs power to a drive shaft, and includes: an internal combustion engine; an electric power-dynamic power input-output module that transmits at least part of power from the internal combustion engine to the drive shaft through input and output of electric power and dynamic power; a motor that inputs and outputs power from and to the drive shaft; an electric accumulator that transmits electric power to and from the electric power-dynamic power input-output module and the motor; and a controller that sets a target power to be output from the internal combustion engine by a first technique, which sets the target power based on a requirement of a driving force to the drive shaft in response to a driver's operation, adopts a second technique, in place of the first technique, in response to the change from the driver's accelerator-on action to accelerator-off action, to set a power, which is lower than the setting of the target power based on the requirement of the driving force by the first technique, to the target power to be output from the internal combustion engine, and controls the internal combustion engine to be driven with the setting of the target power, while controlling the electric power-dynamic power input-output module and the motor to output a driving force corresponding to the requirement of the driving force to the drive shaft.

The third power output apparatus of the invention sets the target power to be output from the internal combustion engine by the first technique, which sets the target power based on a requirement of a driving force to the drive shaft in response to a driver's operation. In response to the driver's accelerator-off action, the third power output apparatus adopts the second technique, in place of the first technique, to set a power, which is lower than the setting of the target power based on the requirement of the driving force by the first technique, to the target power to be output from the internal combustion engine. The third power output apparatus controls the internal combustion engine to be driven with the setting of the target power, while controlling the electric power-dynamic power input-output module and the motor to output a driving force corresponding to the requirement of the driving force to the drive shaft. Due to the decrease in power output from the internal combustion engine, this arrangement reduces the level of the electric power output from the electric power-dynamic power input-output module and the motor to charge the electric accumulator. The third power output apparatus of the invention thus ensures output of the required driving force to the drive shaft in response to the driver's accelerator-off action, while satisfying the charge limit of the electric accumulator.

As one application of the third power output apparatus of the invention, the controller may take into account the target power of the internal combustion engine set based on the requirement of the driving force by the first technique and a smoothed target power obtained by smoothing the target power to set the power, which is lower than the setting of the target power by the first technique, to the target power to be output from the internal combustion engine, when adopting the second technique. In this case, the controller may subtract a difference between the target power set based on the requirement of the driving force by the first technique and the smoothed target power from the setting of the target power of the internal combustion engine by the first technique and set a result of the subtraction to the target power to be output from the internal combustion engine, when adopting the second technique.

A fourth power output apparatus of the present invention includes: an internal combustion engine; an electric power-dynamic power input-output module that transmits at least part of power from the internal combustion engine to the drive shaft through input and output of electric power and dynamic power; a motor that inputs and outputs power from and to the drive shaft; an electric accumulator that transmits electric power to and from the electric power-dynamic power input-output module and the motor; an auxiliary machinery that is activated to consume electric power generated by at least one of the electric accumulator, the electric power-dynamic power input-output module, and the motor; and a controller that controls the internal combustion engine, the electric power-dynamic power input-output module, and the motor to output a required driving force to the drive shaft, and forcibly activates the auxiliary machinery, regardless of a driver's on-off operation, when it is expected that a surplus electric power exceeding a charge limit of the electric accumulator is generated by the control in response to a driver's accelerator-off action to require a braking force to the drive shaft.

When it is expected that a surplus electric power exceeding the charge limit of the electric accumulator is generated by the control of the internal combustion engine, the electric power-dynamic power input-output module, and the motor to output the required braking force to the drive shaft in response to the driver's accelerator-off action, the fourth power output apparatus of the invention forcibly activates the auxiliary machinery, regardless of the driver's on-off operation. Here the electric power-dynamic power input-output module transmits at least part of power from the internal combustion engine to the drive shaft through input and output of electric power and dynamic power. The motor inputs and outputs power from and to the drive shaft. The electric accumulator transmits electric power to and from the electric power-dynamic power input-output module and the motor. The auxiliary machinery is activated to consume electric power generated by at least one of the electric accumulator, the electric power-dynamic power input-output module, and the motor. This arrangement ensures output of the required braking force to the drive shaft in response to the driver's accelerator-off action, while satisfying the charge limit of the electric accumulator. Here, the auxiliary machinery may be an air conditioner.

As one application of the fourth power output apparatus of the invention, the controller may forcibly activate the auxiliary machinery to consume the surplus electric power exceeding the charge limit of the electric accumulator. As another application of the fourth power output apparatus of the invention, when it is expected that a surplus electric power exceeding the charge limit of the electric accumulator is generated by the control of the internal combustion engine, the electric power-dynamic power input-output module, and the motor to output the required driving force to the drive shaft, the controller may control the internal combustion engine, the electric power-dynamic power input-output module, and the motor to make the electric power-dynamic power input-output module motor the internal combustion engine and thereby consume the surplus electric power, while outputting the required driving force to the drive shaft, and the controller may forcibly activate the auxiliary machinery, when the motoring of the internal combustion engine by the electric power-dynamic power input-output module fails to use up all the surplus electric power exceeding the charge limit of the electric accumulator. When it is expected that the control generates a surplus electric power exceeding the charge limit of the electric accumulator, the structure of this application causes the electric power-dynamic power input-output module to motor the internal combustion engine and thereby consume the surplus electric power. In the case where the motoring of the internal combustion engine by the electric power-dynamic power input-output module does not manage to use up all the surplus electric power, the structure of this application forcibly activates the auxiliary machinery to consume the residue of the surplus electric power exceeding the charge limit of the electric accumulator and thereby effectively prevents the electric accumulator from being excessively charged.

As one application of the first through fourth power output apparatus of the present invention, the electric power-dynamic power input-output module may includes: a three-shaft power input-output assembly that is connected with three shafts, that is, an output shaft of the internal combustion engine, the drive shaft, and a third shaft, and specifies input and output of power from and to one residual shaft among the three shafts, based on powers input from and output to two shafts among the three shafts; and a generator that inputs and outputs power from and to the third shaft. The electric power-dynamic power input-output module may be a pair-rotor motor, which includes a first rotor linked with an output shaft of the internal combustion engine and a second rotor linked with the drive shaft and outputs at least part of the power from the internal combustion engine to the drive shaft accompanied with input and output of electric power generated through an electromagnetic interaction between the first rotor and the second rotor.

The present invention may be an automobile that is equipped with any of the above first through fourth power output apparatus, with drive shaft mechanically linked with an axle of the automobile.

A fifth power output apparatus of the present invention outputs power to a drive shaft, and includes: an internal combustion engine; an electric power-dynamic power input-output module that has a first AC motor and outputs at least part of power from the internal combustion engine to the drive shaft through input and output of electric power and dynamic power to from and to the first AC motor; a second AC motor that inputs and outputs power from and to the drive shaft; an electric accumulator that transmits electric power to and from the first AC motor and the second AC motor; and a controller that sets a specific drive point of the internal combustion engine to output a required driving force to the drive shaft, actuates and controls the internal combustion engine, the first AC motor, and the second AC motor to drive the internal combustion engine at the preset specific drive point and to ensure output of a driving force corresponding to the required driving force to the drive shaft, and carries out surplus electric power consumption control in the presence of a surplus electric power exceeding a charge limit of the electric accumulator, wherein the surplus electric power consumption control actuates and controls the first AC motor and the second AC motor to make at least part of the surplus electric power consumed by at least one of the first AC motor and the second AC motor through input and output of an invalid component of electric power having no contribution to generation of driving force.

The fifth power output apparatus of the invention sets a specific drive point of the internal combustion engine to output a required driving force to the drive shaft, actuates and controls the internal combustion engine, the first AC motor, and the second AC motor to drive the internal combustion engine at the preset specific drive point and to ensure output of a driving force corresponding to the required driving force to the drive shaft, and carries out surplus electric power consumption control in the presence of a surplus electric power exceeding a charge limit of the electric accumulator. The surplus electric power consumption control actuates and controls the first AC motor and the second AC motor to make at least part of the surplus electric power consumed by at least one of the first AC motor and the second AC motor through input and output of an invalid component of electric power having no contribution to generation of driving force. This arrangement effectively prevents the electric accumulator from being excessively charged or being charged with excess voltage, while ensuring output of the driving force corresponding to the required driving force to the drive shaft. At least part of the surplus electric power is consumed by the first AC motor or by the second AC motor. There is accordingly no need of providing any additional device for consumption of the surplus electric power.

As one application of the fifth power output apparatus of the invention, the controller may carry out the surplus electric power consumption control, in response to a driver's accelerator-off action to require a braking force to the drive shaft.

As another application of the fifth power output apparatus of the invention, the electric power-dynamic power input-output module may include a three-shaft power input-output assembly that is connected with three shafts, that is, an output shaft of the internal combustion engine, the drive shaft, and a third shaft, and specifies input and output of power from and to one residual shaft among the three shafts, based on powers input from and output to two shafts among the three shafts, and the first AC motor may be a motor generator that is capable of inputting and outputting power from and to the third shaft. The first AC motor may be a pair-rotor motor, which includes a first rotor linked with an output shaft of the internal combustion engine and a second rotor linked with the drive shaft and outputs at least part of the power from the internal combustion engine to the drive shaft accompanied with input and output of electric power generated through an electromagnetic interaction between the first rotor and the second rotor.

The present invention may be an automobile that is equipped with a power output apparatus, with the drive shaft mechanically linked with an axle of the automobile. In this case, the controller may carry out the surplus electric power consumption control in response to the occurrence of a slip due to spinning of wheels linked with the axle.

A first method of controlling a power output apparatus of the invention is a method of controlling a power output apparatus that has an internal combustion engine; an electric power-dynamic power input-output module that transmits at least part of power from the internal combustion engine to a drive shaft through input and output of electric power and dynamic power; a motor that inputs and outputs power from and to the drive shaft; and an electric accumulator that transmits electric power to and from the electric power-dynamic power input-output module and the motor, and the method includes the steps of: (a) in response to a driver's accelerator-off action to require a braking force to the drive shaft, setting a specific drive point of the internal combustion engine to attain output of a braking force corresponding to the requirement of the braking force to the drive shaft, based on the requirement of the braking force and a charge limit of the electric accumulator, and (b) controlling the internal combustion engine, the electric power-dynamic power input-output module, and the motor to drive the internal combustion engine at the preset specific drive point and to ensure output of the braking force corresponding to the requirement of the braking force to the drive shaft.

A second method of controlling a power output apparatus of the invention is a method of controlling a power output apparatus that has an internal combustion engine; an electric power-dynamic power input-output module that transmits at least part of power from the internal combustion engine to a drive shaft through input and output of electric power and dynamic power; a motor that inputs and outputs power from and to the drive shaft; and an electric accumulator that transmits electric power to and from the electric power-dynamic power input-output module and the motor, and the method includes the steps of: (a) in response to a driver's accelerator-off action to require a braking force to the drive shaft, setting a limit braking force as a restriction to the requirement of the braking force by taking into account an increase limit imposed on an increase in revolution speed of the internal combustion engine by input and output of power from and to the electric power-dynamic power input-output module and a charge limit of the electric accumulator, and (b) controlling the internal combustion engine, the electric power-dynamic power input-output module, and the motor to ensure output of a braking force corresponding to the requirement of the braking force to the drive shaft under restriction of the setting of the limit braking force.

A third method of controlling a power output apparatus of the invention is a method of controlling a power output apparatus that has an internal combustion engine; an electric power-dynamic power input-output module that transmits at least part of power from the internal combustion engine to a drive shaft through input and output of electric power and dynamic power; a motor that inputs and outputs power from and to the drive shaft; and an electric accumulator that transmits electric power to and from the electric power-dynamic power input-output module and the motor, and the method includes the steps of: (a) setting a target power to be output from the internal combustion engine, based on a requirement of a driving force to the drive shaft in response to a driver's operation; (b) in response to the change from the driver's accelerator-on action to accelerator-off action, invalidating the setting of the target power in the step (a) but setting a power, which is lower than the setting of the target power based on the requirement of the driving force in the step (a), to the target power to be output from the internal combustion engine; and (c) controlling the internal combustion engine to be driven with the setting of the target power, while controlling the electric power-dynamic power input-output module and the motor to output a driving force corresponding to the requirement of the driving force to the drive shaft.

A fourth method of controlling a power output apparatus of the invention is a method of controlling a power output apparatus that has an internal combustion engine; an electric power-dynamic power input-output module that transmits at least part of power from the internal combustion engine to a drive shaft through input and output of electric power and dynamic power; a motor that inputs and outputs power from and to the drive shaft; an electric accumulator that transmits electric power to and from the electric power-dynamic power input-output module and the motor; and an auxiliary machinery that is activated to consume electric power generated by at least one of the electric accumulator, the electric power-dynamic power input-output module, and the motor, and the method includes the steps of: (a) controlling the internal combustion engine, the electric power-dynamic power input-output module, and the motor to output a required driving force to the drive shaft, and (b) forcibly activating the auxiliary machinery, regardless of a driver's on-off operation, when it is expected that a surplus electric power exceeding a charge limit of the electric accumulator is generated by the control in the step(a) in response to a driver's accelerator-off action to require a braking force to the drive shaft.

A fifth method of controlling a power output apparatus of the invention control a power output apparatus that has an internal combustion engine; an electric power-dynamic power input-output module that has a first AC motor and outputs at least part of power from the internal combustion engine to the drive shaft through input and output of electric power and dynamic power from and to the first AC motor; a second AC motor that inputs and outputs power from and to the drive shaft; and an electric accumulator that transmits electric power to and from the first AC motor and the second AC motor, and the method includes the steps of: (a) setting a specific drive point of the internal combustion engine to output a required driving force to the drive shaft; and (b) actuating and controlling the internal combustion engine, the first AC motor, and the second AC motor to drive the internal combustion engine at the preset specific drive point and to ensure output of a driving force corresponding to the required driving force to the drive shaft, while in the presence of a surplus electric power exceeding a charge limit of the electric accumulator, actuating and controlling the first AC motor and the second AC motor to make at least part of the surplus electric power consumed by at least one of the first AC motor and the second AC motor through input and output of an invalid component of electric power having no contribution to generation of driving force.

DESCRIPTION OF THE PREFERRED EMBODIMENTS

Figure 1:
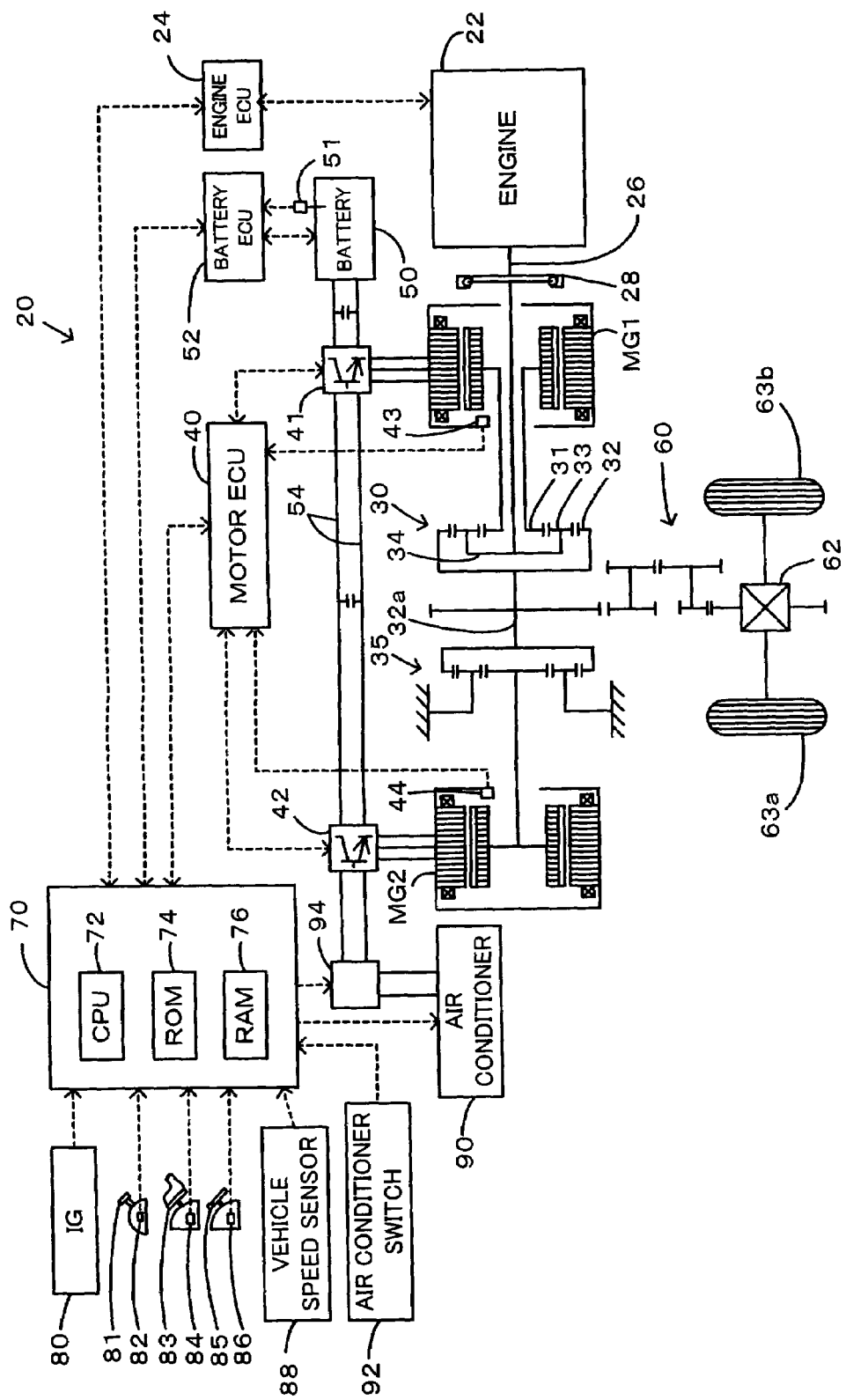
FIG. 1 schematically illustrates the construction of a hybrid vehicle with a power output apparatus mounted thereon in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor (for example, a PM synchronous motor generator having a rotor with permanent magnets mounted on the outer surface thereof and a stator with three-phase coils wound thereon). The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

An air conditioner 90 functioning to condition the air in the interior space of the hybrid vehicle 20 is connected via a converter 94 to the power line 54, which is linked with the battery 50 and the motors MG1 and MG2. The air conditioner 90 is actuated with electric power stored in the battery 50 and supplied via the converter 94 and with electric power generated by the motors MG1 and MG2.

The hybrid electronic control unit 70 is constructed as a microprocessor and includes a CPU 72, a ROM 74 that stores processing programs, a RAM 76 that temporarily stores data, an input-output port (not shown), and a communication port (not shown). The hybrid electronic control unit 70 receives various data and signals via the input port. The input data and signals include an ignition signal from an ignition switch 80, a gearshift position SP from a gearshift position sensor 82 that detects the current position of a gearshift lever 81, an accelerator opening Acc from an accelerator pedal position sensor 84 that detects the step-on amount of an accelerator pedal 83, a brake pedal position BP from a brake pedal position sensor 86 that detects the step-on amount of a brake pedal 85, a vehicle speed V from a vehicle speed sensor 88, and an operation signal from an air conditioner switch 92 that activates and deactivates the air conditioner 90. The hybrid electronic control unit 70 is connected with the engine ECU 24, the motor ECU 40, and the battery ECU 52 via the communication port as discussed above and transmits various control signals and data to and from the engine ECU 24, the motor ECU 40, and the battery ECU 52.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 2:
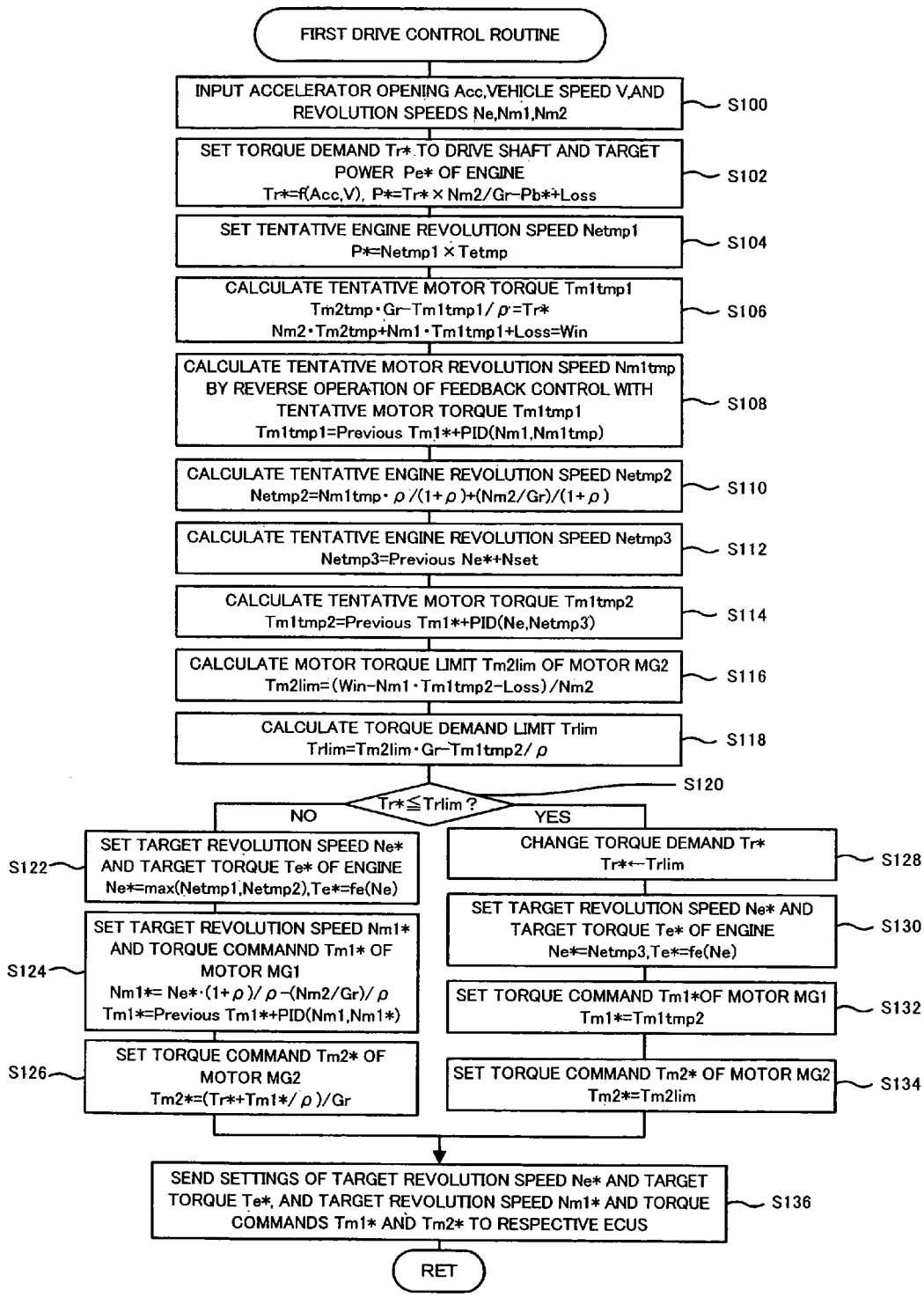
FIG. 2 is a flowchart showing a first drive control routine executed by a hybrid electronic control unit included in the hybrid vehicle of the embodiment.

The following describes the operations of the hybrid vehicle 20 of the embodiment constructed as discussed above, especially an operation when the drivers steps off the accelerator pedal 83. FIG. 2 is a flowchart showing a first drive control routine, which is executed by the hybrid electronic control unit 70 in the hybrid vehicle 20 of the embodiment. This routine is repeatedly executed at preset time intervals (for example, at every 8 msec) since the driver's step-off action of the accelerator pedal 83. The driver's step-off action of the accelerator pedal 83 may be specified, for example, based on a difference between the previous accelerator opening Acc and the current accelerator opening Acc detected by the accelerator pedal position sensor 84.

When the program enters the first drive control routine, the CPU 72 of the hybrid electronic control unit 70 first inputs required data for control, which include the accelerator opening Acc representing the step-on amount of the accelerator pedal 83, the vehicle speed V sent from the vehicle speed sensor 88, a revolution speed Ne of the crankshaft 26 of the engine 22, and revolution speeds Nm1 and Nm2 of the motors MG1 and MG2 (step S100). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 into the hybrid electronic control unit 70 via communication. The revolution speed Ne of the engine 22 is calculated from the revolution speed Nm1 of the motor MG1, a revolution speed Nr of the ring gear shaft 32*a*, and a gear ratio ρ (the number of teeth of the sun gear/the number of teeth of the ring gear) of the power distribution integration mechanism 30. Here the revolution speed Nr of the ring gear shaft 32a is obtained by dividing the revolution speed Nm2 of the motor MG2 by a gear ratio Gr (the revolution speed of the motor MG2/the revolution speed of the ring gear shaft 32a) of the reduction gear 35. Another available structure may attach a revolution speed sensor to the crankshaft 26 of the engine 22 and directly measure the revolution speed Ne of the engine 22.

Figure 3:
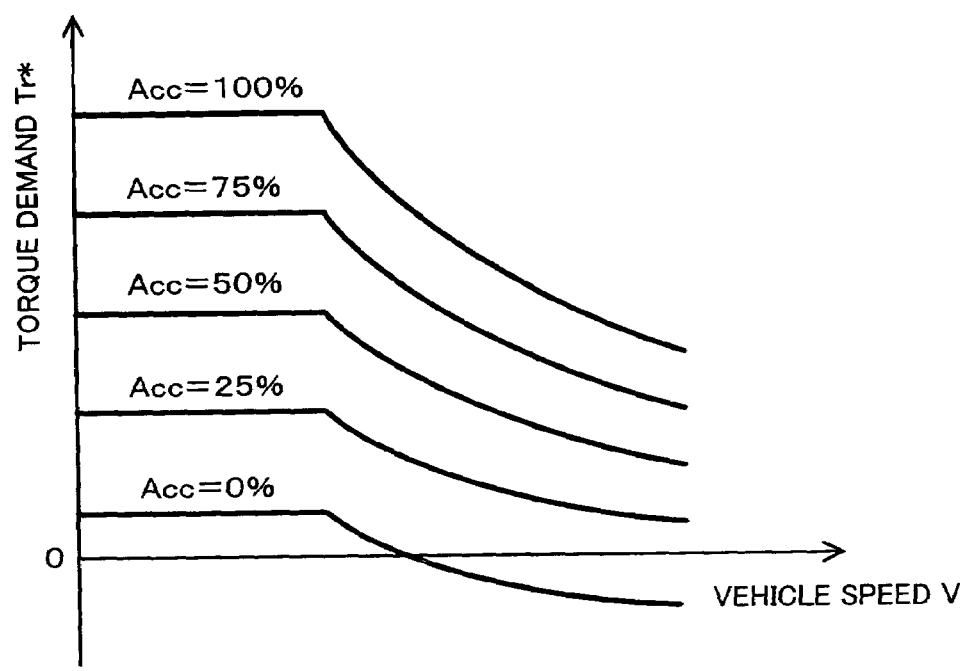
FIG. 3 shows a map representing a mapping of accelerator opening Acc and vehicle speed V to torque demand Tr*.

After the input of the required data, the CPU 72 sets a required torque Tr*, which is to be output to the ring gear shaft 32a functioning as the drive shaft, and a target power Pe*, which is to be output from the engine 22, based on the input accelerator opening Acc and vehicle speed V (step S102). In the structure of this embodiment, a mapping of the accelerator opening Acc and the vehicle speed V to the torque demand Tr* is specified in advance and is stored in the form of a torque demand setting map into the ROM 74. The procedure of this embodiment reads and sets the value of the torque demand Tr* corresponding to the input data of the accelerator opening Acc and the vehicle speed V from the torque demand setting map stored in the ROM 74. FIG. 3 shows one example of the torque demand setting map. The target power Pe* of the engine 22 is given as the sum of the product of the torque demand Tr* and a revolution speed Nr of the ring gear shaft 32a, a charge-discharge demand or required charge-discharge quantity Pb* of the battery 50, and a potential loss. Here the charge-discharge demand Pb* of the battery 50 is set according to a state of charge (SOC) of the battery 50. The revolution speed Nr of the ring gear shaft 32a may be obtained by multiplying the vehicle speed V by a conversion coefficient k or by dividing the revolution speed Nm2 of the motor MG2 by the gear ratio Gr of the reduction gear 35.

After setting the target power Pe* of the engine 22, the CPU 72 sets the revolution speed of an efficient drive point of the engine 22, which is selected among drive points (points defined by the combinations of the torque and the revolution speed) fulfilling the target power Pe*, to a tentative engine revolution speed Netmp1 (step S104).

Figure 4:
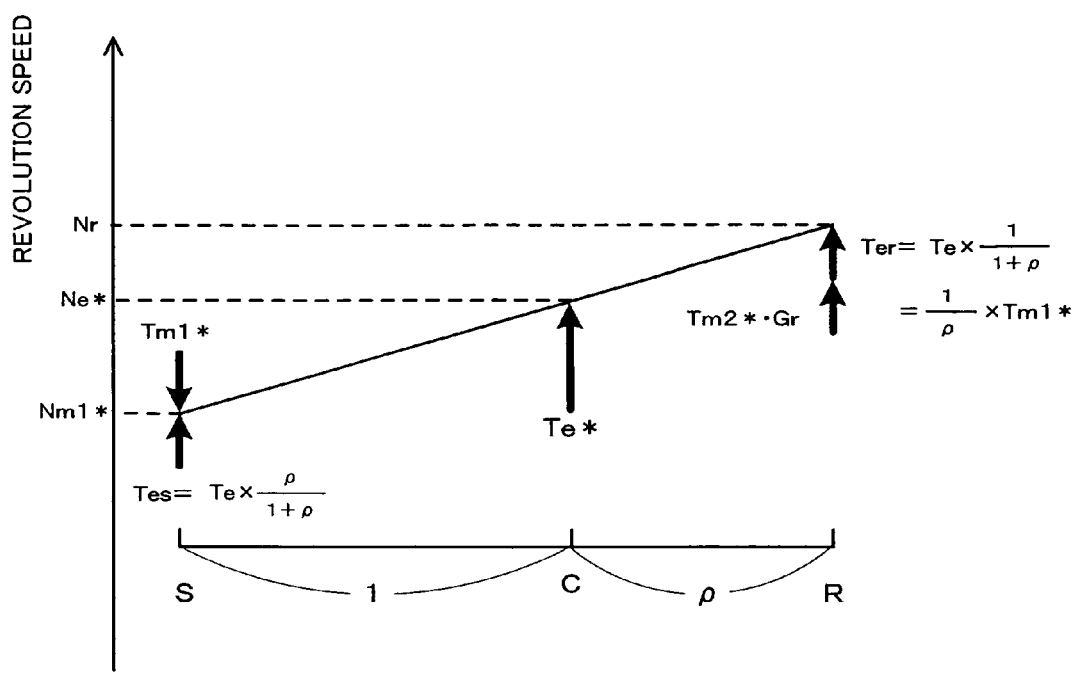
FIG. 4 is an alignment chart showing a dynamic relation between the revolution speed and the torque of rotational elements in a power distribution integration mechanism included in the hybrid vehicle of the embodiment.

The CPU 72 subsequently calculates a tentative motor torque Tm1tmp1 of the motor MG1 from the setting of the torque demand Tr*, which was specified at step S102 to be output to the ring gear shaft 32a functioning as the drive shaft, and a charge limit Win (this takes a negative value in the charging direction) of the battery 50 according to Equations (1) and (2) given below (step S106). Equation (1) shows a specific relation that the summation of the torques output from the motors MG1 and MG2 and transmitted to the ring gear shaft 32a or the drive shaft is equal to the torque demand Tr*. Equation (2) shows another specific relation that the sum of the summation of electric powers input into and output from the motors MG1 and MG2 and a potential loss is equal to the charge limit Win of the battery 50. The charge limit Win of the battery 50 is specified according to an observed battery temperature Tb and a state of charge (SOC) of the battery 50. FIG. 4 is an alignment chart showing a dynamic relation between the revolution speed and the torque of rotational elements in the power distribution integration mechanism 30. In the alignment chart of FIG. 4, two thick arrows on an axis R respectively represent a torque acting on the ring gear shaft 32a as a torque Te* output from the engine 22 is transmitted via the power distribution integration mechanism 30 while the engine 22 is steadily driven at a specific drive point defined by a target torque Te* and a target revolution speed Ne*, and a torque output from the motor MG2 and transmitted to the ring gear shaft 32a via the reduction gear 35. The left side of Equation (1) accordingly represents the sum of the torque transmitted to the ring gear shaft 32a via the reduction gear 35 when a torque Tm2tmp is output from the motor MG2 and the torque transmitted to the ring gear shaft 32a via the power distribution integration mechanism 30 when a torque Tm1tmp1 is output from the motor MG1.

$$Tm2tmp \cdot Gr - Tm1tmp1/\rho = Tr^* \quad (1)$$

$$Nm2 \cdot Tm2tmp + Nm1 \cdot Tm1tmp + \text{Loss} = \text{Win} \quad (2)$$

The CPU 72 subsequently calculates a tentative motor revolution speed Nm1tmp by substituting the calculated tentative motor torque Tm1tmp1 in place of a torque command Tm1* into Equation (3) given below and reversely calculating Equation (3) (step S108). Equation (3) determines a torque to be output from the motor MG1 (torque command Tm1*) in feedback control to rotate the motor MG1 at a setting of a target revolution speed Nm1*, based on a difference between the target revolution speed Nm1* and an observed current revolution speed Nm1. The relation between the tentative motor torque Tm1tmp1 and the tentative motor revolution speed Nm1tmp is given below as Equation (4). The function PID in Equations (3) and (4) has a proportional term, an integral term, and a differential term for feedback control. The term 'PreviousTm1*' represents a previous torque command Tm1* of the motor MG1, which was set at step S124 or at step S132 (discussed later) in the previous cycle of the first drive control routine.

$$Tm1^* = PreviousTm1^* + PID(Nm1^*, Nm1) \quad (3)$$

$$Tm1tmp1 = PreviousTm1^* + PID(Nm1^*, Nm1tmp) \quad (4)$$

After calculation of the tentative motor revolution speed Nm1tmp, the CPU 72 calculates a tentative engine revolution speed Netmp2 from the calculated tentative motor revolution speed Nm1tmp, the observed current revolution speed Nr (=Nm2/Gr) of the ring gear shaft 32a, and the gear ratio ρ of the power distribution integration mechanism 30 according to Equation (5) given below (step S110). The processing of steps S106 to S110 results in determining the tentative engine revolution speed Netmp2 as the revolution speed of the engine 22 that satisfies both the torque demand Tr* to be output to the ring gear shaft 32a or the drive shaft and the charge limit Win of the battery 50.

$$Netmp2 = Nm1tmp \cdot \rho/(1+\rho) + (Nm2/Gr)/(1+\rho) \quad (5)$$

The CPU 72 subsequently sums up a previous target revolution speed Ne* of the engine 22 (PreviousNe*), which was set at step S122 or at step S130 (discussed later) in the previous cycle of the first drive control routine, and an incremental revolution speed Nset specified as an incremental limit to determine a tentative engine revolution speed Netmp3 (step S112). The CPU 72 then calculates a tentative motor torque Tm1tmp2 to be output from the motor MG1 in feedback control to rotate the engine 22 at the tentative engine revolution speed Netmp3, based on a difference between the calculated tentative engine revolution speed Netmp3 and the observed current revolution speed Ne of the engine 22, according to Equation (6) given below (step S114).

$$Tm1tmp2 = PreviousTm1^* + PID(Ne, Netmp3) \quad (6)$$

The CPU 72 subtracts the product (electric power) of the tentative motor torque Tm1tmp2 of the motor MG1 calculated at step S114 and the observed current revolution speed Nm1 of the motor MG1 and a potential loss from the charge limit Win of the battery 50 and divides the result of the subtraction by the observed current revolution speed Nm2 of the motor MG2, so as to determine a motor torque limit Tm2lim to be output from the motor MG2 (step S116). The CPU 72 subsequently calculates a torque demand limit Trlim to be output to the ring gear shaft 32a or the drive shaft from the calculated motor torque limit Tm2lim, the tentative motor torque Tm1tmp2 calculated at step S114, and the gear ratio ρ of the power distribution integration mechanism 30 according to Equation (7) given below (step S118). The processing of steps S112 to S118 results in determining the limit of a braking torque to be output to the ring gear shaft 32a in the range of the charge limit Win of the battery 50 when the revolution speed of the engine 22 is raised to the extent of moderate boost-up of the engine 22 by the output of the torque from the motor MG1.

$$Trlim = Tm2\text{lim} \cdot Gr - Tm1tmp2/\rho \qquad (7)$$

After calculation of the torque demand limit Trlim, the setting of the torque demand Tr*, which was specified at step S102 to be output to the ring gear shaft 32a or the drive shaft, is compared with the calculated torque demand limit Trlim (step S120). As both the torque demand Tr* and the torque demand limit Trlim are negative values, the procedure of step S120 determines whether the absolute value of the torque demand Tr* is not less than the absolute value of the torque demand limit Trlim. When it is determined at step S120 that the torque demand Tr* is greater than the torque demand limit Trlim, the CPU 72 sets the greater between the tentative engine revolution speed Netmp1 calculated at step S104 and the tentative engine revolution speed Netmp2 calculated at step S110 to a target revolution speed Ne* of the engine 22, while dividing the target power Pe* of the engine 22 by the setting of the target revolution speed Ne* to set a target torque Te* of the engine 22 (step S122). This process determines the target revolution speed Ne* as the revolution speed of the engine 22 that satisfies both the torque demand Tr* and the charge limit Win of the battery 50. The CPU 72 then sets a target revolution speed Nm1* of the motor MG1, based on the setting of the target revolution speed Ne* of the engine 22, the revolution speed Nr (=Nm2/Gr) of the ring gear shaft 32a, and the gear ratio ρ of the power distribution integration mechanism 30 according to Equation (8) given below, while setting a torque command Tm1* of the motor MG1, based on the setting of the target revolution speed Nm1* and the observed current revolution speed Nm1 of the motor MG1 according to Equation (3) given above (step S124). The CPU 72 subsequently sets a torque command Tm2* of the motor MG2, based on the setting of the torque demand Tr*, the setting of the torque command Tm1* of the motor MG1, the gear ratio ρ of the power distribution integration mechanism 30, and the gear ratio Gr of the reduction gear 35 according to Equation (9) given below (step S126).

$$Nm1^* = Ne^* \cdot (1+\rho)/\rho + (Nm2/Gr)/\rho \qquad (8)$$

$$Tm2^* = (Tr^* + Tm1^*/\rho)/Gr \qquad (9)$$

When it is determined at step S120 that the torque demand Tr* is not greater than the torque demand limit Trlim, on the other hand, failure of the output of the torque demand Tr* to the ring gear shaft 32a is predicted under the conditions of the incremental limit of the revolution speed of the engine 22 and the charge limit Win of the battery 50. The CPU 72 accordingly changes the setting of the torque demand Tr* specified at step S102 to the torque demand limit Trlim (step S128), and sets the tentative engine revolution speed Netmp3 calculated at step S112 to the target revolution speed Ne* of the engine 22, while dividing the target power Pe* of the engine 22 by the setting of the target revolution speed Ne* to set the target torque Te* (step S130). The CPU 72 subsequently sets the tentative motor torque Tm1tmp2 calculated at step S114 to the torque command Tm1* of the motor MG1 (step S132), and sets the motor torque limit Tm2lim calculated at step S116 to the torque command Tm2* of the motor MG2 (step S134).

Either the processing of steps S122 to S126 or the processing of steps S130 to S134 is carried out in the above manner to set the target revolution speed Ne* and the target torque Te* of the engine 22, the torque command Tm1* and the target revolution speed Nm1* of the motor MG1, and the torque command Tm2* of the motor MG2. On completion of the setting, the CPU 72 sends the settings of the target revolution speed Ne* and the target torque Te* of the engine 22 to the engine ECU 24, while sending the settings of the torque command Tm1* and the target revolution speed Nm1* of the motor MG1 and the torque command Tm2* of the motor MG2 to the motor ECU 40 (step S136). The program then exits from this first drive control routine. The engine ECU 24 receives the target revolution speed Ne* and the target torque Te* and carries out operation control of the engine 22 including fuel injection control and ignition control to make the engine 22 driven at the specific drive point defined by the target revolution speed Ne* and the target torque Te*. The motor ECU 40 receives the target revolution speed Nm1*, the torque command Tm1*, and the torque command Tm2* and carries out switching control of the switching elements included in the inverters 41 and 42 to make the motor MG1 driven with the torque command Tm1* and the motor MG2 driven with the torque command Tm2*.

As described above, the hybrid vehicle 20 of the embodiment sets the greater between the revolution speed at a given drive point of the engine 22 (a drive point of high efficiency) that outputs the target power Pe* set according to the torque demand Tr* to the ring gear shaft 32a (that is, the tentative engine revolution speed Netmp1) and the revolution speed satisfying both the torque demand Tr* to the ring gear shaft 32a and the charge limit Win of the battery 50 (that is, the tentative engine revolution speed Netmp2) to the target revolution speed Ne* of the engine 22 and carries out operation controls of the engine 22 and the motors MG1 and MG2. This arrangement ensures output of the torque demand Tr* to the ring gear shaft 32a, while effectively preventing the battery 50 from being charged excessively. Namely the hybrid vehicle 20 of the embodiment desirably prevents the deterioration of drivability, while taking into account the charge limit Win of the battery 50.

The hybrid vehicle 20 of the embodiment controls the operations of the engine 22 and the motor MG1 and MG2 under the restriction of the torque demand Tr* to the torque demand limit Trlim, which is specified by taking into account the incremental limit of the revolution speed of the engine 22 corresponding to the output torque from the motor MG1 and the charge limit Win of the battery 50. This arrangement ensures output of the torque demand Tr* to the ring gear shaft 32a, while effectively preventing the battery 50 from being charged excessively and attaining the moderate boost-up of the revolution speed of the engine 22.

The hybrid vehicle 20 of the embodiment places restrictions on the torque demand Tr* by taking into account the incremental limit of the revolution speed of the engine 22 and the charge limit Win of the battery 50. One possible modification may exclude the incremental limit of the revolution speed of the engine 22 from the objects of consideration. The procedure of this modified arrangement omits the processing of steps S112 to S120 and the processing of steps S128 to S134 from the first drive control routine shown in FIG. 2.

The hybrid vehicle 20 of the embodiment takes into account the revolution speed of the engine 22 that satisfies both the torque demand Tr* and the charge limit Win of the battery 50 to set the target revolution speed Ne* of the engine 22. One possible modification may exclude the revolution speed of the engine 22 that satisfies both the torque demand Tr* and the charge limit Win of the battery 50 from the objects of consideration. The procedure of this modified arrangement omits the processing of step S106 to S110 from the first drive control routine shown in FIG. 2 and sets the tentative engine revolution speed Netmp1 calculated at step S104 to the target revolution speed Ne* of the engine 22 at step S122.

The hybrid vehicle 20 of the embodiment substitutes the tentative motor torque Tm1tmp1 into the equation of PID feedback control and reversely calculates the equation to determine the tentative motor revolution speed Nm1tmp, in the process of calculation of the tentative engine revolution speed Netmp2. The feedback control is not restricted to the PID control, but may be PI control without a differential term or proportional control without an integral term.

Figure 5:
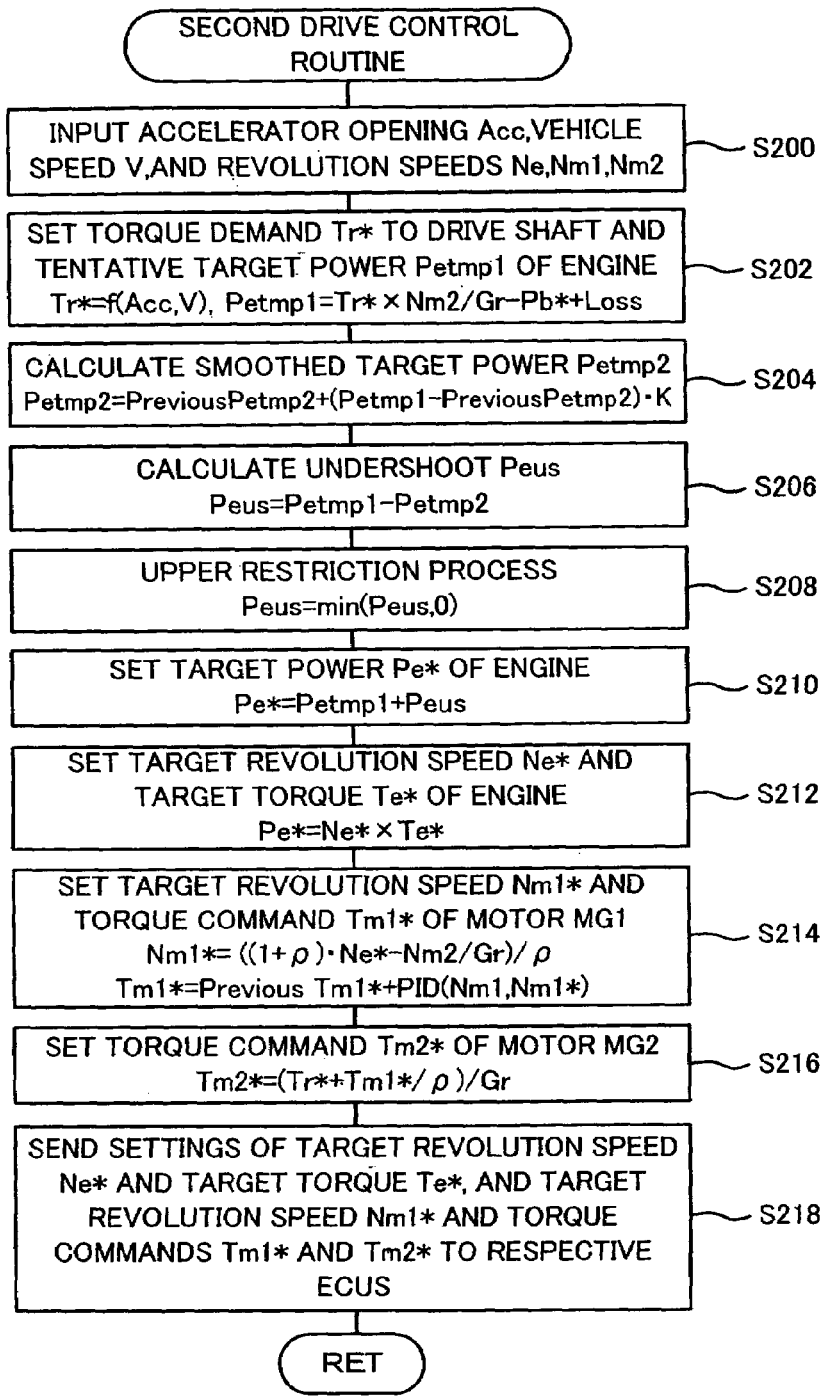
FIG. 5 is a flowchart showing a second drive control routine executed by the hybrid electronic control unit in a hybrid vehicle of a second embodiment.

The following describes a hybrid vehicle of a second embodiment. The hybrid vehicle of the second embodiment has the identical construction with that of the hybrid vehicle 20 of the embodiment, except some differences of processing executed by the hybrid electronic control unit 70. The constituents of the hybrid vehicle of the second embodiment that are identical with those of the hybrid vehicle 20 of the embodiment are expressed by the same numerals and symbols and are not specifically described here. FIG. 5 is a flowchart showing a second drive control routine, which is executed by the hybrid electronic control unit 70 in the hybrid vehicle of the second embodiment. This routine is repeatedly executed at preset time intervals (for example, at every 8 msec) since the driver's step-off action of the accelerator pedal 83. The driver's step-off action of the accelerator pedal 83 may be specified, for example, based on a difference between the previous accelerator opening Acc and the current accelerator opening Acc detected by the accelerator pedal position sensor 84.

When the program enters the second drive control routine, the CPU 72 of the hybrid electronic control unit 70 first inputs the required data for control, which include the accelerator opening Acc, the vehicle speed V, the revolution speed Ne of the engine 22, and the revolution speeds Nm1 and Nm2 of the motors MG1 and MG2 (step S200). The CPU 72 then sets the torque demand Tr* to the ring gear shaft 32a or the drive shaft corresponding to the input accelerator opening Acc and vehicle speed V, for example, based on the map of FIG. 3, while summing up the product of the torque demand Tr* and the revolution speed Nr (=Nm2/Gr) of the ring gear shaft 32a, the charge-discharge demand Pb* of the battery 50, and a potential loss to set a tentative target power Petmp1 to be output from the engine 22 (step S202). The processing of steps S200 and S202 is similar to the processing of steps S100 and S102 in the first drive control routine of FIG. 2.

The CPU 72 subsequently makes the setting of the tentative target power Petmp1 of the engine 22 subjected to a smoothing process to calculate a smoothed target power Petmp2 according to Equation (10) given below (step S204). In Equation (10), the term 'PreviousPetmp2' represents a smoothed target power, which was calculated in the previous cycle of the second drive control routine, and 'K' denotes a constant set in a range of a value '1' to a value '0' to ensure a smooth change of the target power of the engine 22.

$$Petmp2 = PreviousPetmp2 + (Petmp1 - PreviousPetmp2) \cdot K \quad (10)$$

The CPU 72 then sets a difference between the tentative target power Petmp1 and the smoothed target power Petmp2 to an undershoot Peus (step S206), restricts the setting of the undershoot Peus to an upper limit '0' to keep the undershoot Peus negative (step S208), and sums up the tentative target power Petmp1 of the engine 22 and the negative undershoot Peus to set a target power Pe* of the engine 22 (step S210). The undershoot Peus is used to make the target power Pe* lower than the expected power to be output from the engine 22 (the tentative target power Petmp1) according to the torque demand Tr* to the ring gear shaft 32a or the drive shaft and the charge-discharge demand Pb* of the battery 50. The process sets the target power Pe* of the engine 22 to be lower than the tentative target power Petmp1 by the undershoot Peus and controls the engine 22 to output the target power Pe*, while setting torque commands Tm1* and Tm2* of the motors MG1 and MG2 to make the torque demand Tr* act on the ring gear shaft 32a and controlling the motors MG1 and MG2. Such control reduces the electric power accumulated in the battery 50 by a quantity corresponding to the undershoot Peus. This arrangement enables the torque demand Tr* (braking force) to be transmitted to the ring gear shaft 32a in response to the driver's step-off action of the accelerator pedal 83, while effectively preventing the battery 50 from being excessively charged with regenerative energy regenerated by the motor MG2 (in some cases, by both the motors MG1 and MG2).

After setting the target power Pe* of the engine 22, the CPU 72 sets the torque and the revolution speed of an efficient drive point of the engine 22, which is selected among drive points fulfilling the target power Pe*, to a target torque Te* and a target revolution speed Ne* of the engine 22 (step S212). The CPU 72 then sets a target revolution speed Nm1* of the motor MG1, based on the setting of the target revolution speed Ne* of the engine 22, the revolution speed Nr (=Nm2/Gr) of the ring gear shaft 32a, and the gear ratio ρ of the power distribution integration mechanism 30 according to Equation (8) given above, while setting a torque command Tm1* of the motor MG1, based on the setting of the target revolution speed Nm1* and the observed current revolution speed Nm1 of the motor MG1 according to Equation (3) given above (step S214) The CPU 72 subsequently sets a torque command Tm2* of the motor MG2, based on the torque demand Tr*, the torque command Tm1* of the motor MG1, the gear ratio ρ of the power distribution integration mechanism 30, and the gear ratio Gr of the reduction gear 35 according to Equation (9) given above (step S216). The CPU 72 then sends the settings of the target revolution speed Ne* and the target torque Te* of the engine 22 to the engine ECU 24, while sending the settings of the torque command Tm1* and the target revolution speed Nm1* of the motor MG1 and the torque command Tm2* of the motor MG2 to the motor ECU 40 (step S218). The program then exits from this second drive control routine.

As described above, the hybrid vehicle of the second embodiment sets the target power Pe*, which is lower than the expected power to be output from the engine 22 (that is, the tentative target power Petmp1) according to the torque demand Tr* to the ring gear shaft 32a and the charge-discharge demand Pb* of the battery 50 and controls the engine 22 to output the target power Pe*, while setting the torque commands Tm1* and Tm2* of the motors MG1 and MG2 to make the torque demand Tr* act on the ring gear shaft 32a and controlling the motors MG1 and MG2. This arrangement enables the torque demand Tr* corresponding to the driver's step-off action of the accelerator pedal 83 to be applied to the ring gear shaft 32a, while effectively preventing the battery 50 from being excessively charged with the regenerative energy regenerated by the motor MG2 (in some cases, by both the motors MG1 and MG2). Namely the hybrid vehicle of the second embodiment desirably prevents the deterioration of drivability, while taking into account the charge limit Win of the battery 50.

The hybrid vehicle of the second embodiment sets the difference between the tentative target power Petmp1 and the smoothed target power Petmp2 gained by smoothing the tentative target power Petmp1 to the undershoot Peus. Such setting is, however, not restrictive at all, but any preset value may be set to the undershoot Peus.

Figure 6:
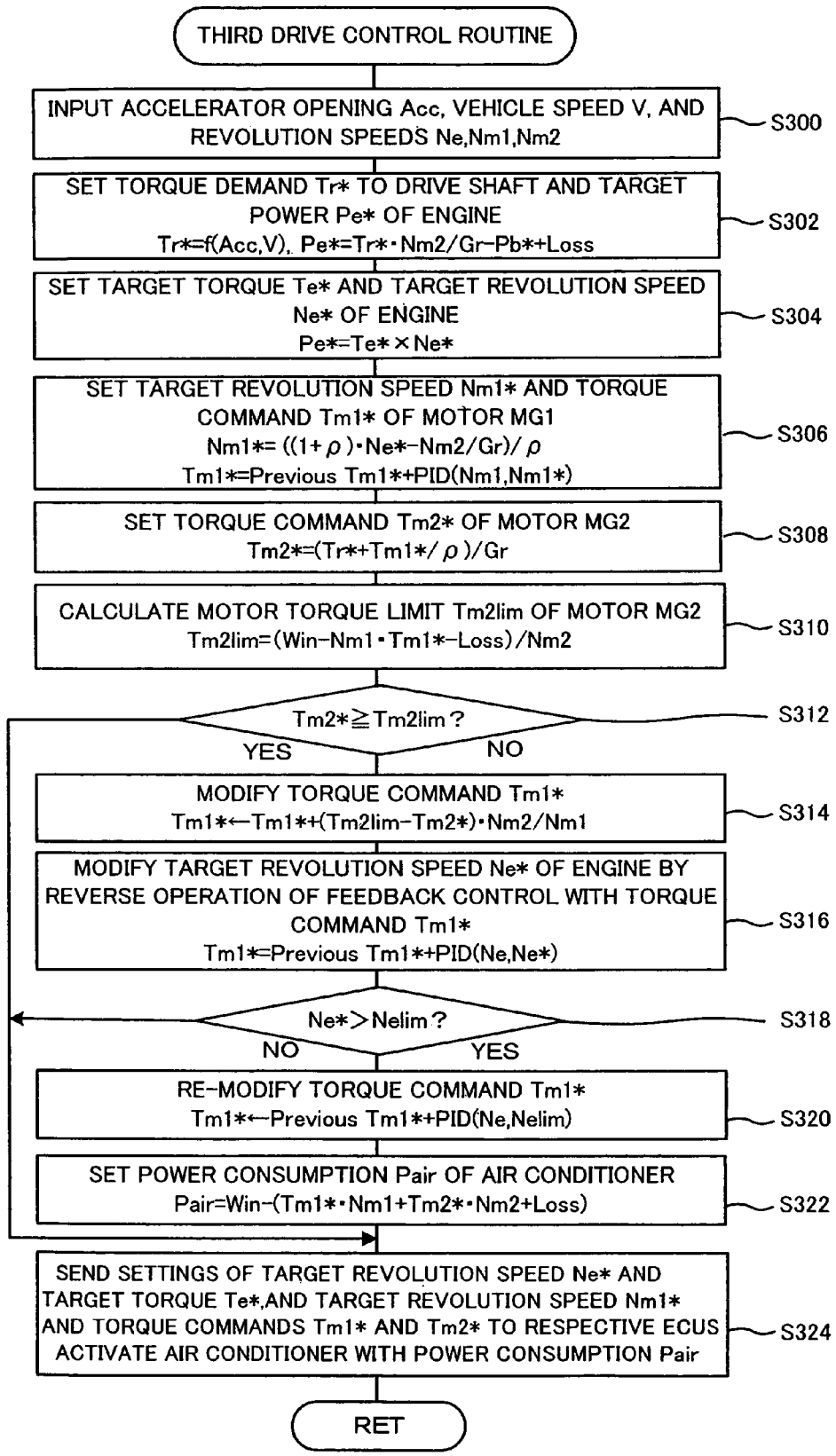
FIG. 6 is a flowchart showing a third drive control routine executed by the hybrid electronic control unit in a hybrid vehicle of a third embodiment.

The following describes a hybrid vehicle of a third embodiment. The hybrid vehicle of the third embodiment has the identical construction with that of the hybrid vehicle 20 of the embodiment, except some differences of processing executed by the hybrid electronic control unit 70. The constituents of the hybrid vehicle of the third embodiment that are identical with those of the hybrid vehicle 20 of the embodiment are expressed by the same numerals and symbols and are not specifically described here. FIG. 6 is a flowchart showing a third drive control routine, which is executed by the hybrid electronic control unit 70 in the hybrid vehicle of the third embodiment. This routine is repeatedly executed at preset time intervals (for example, at every 8 msec) since the driver's step-off action of the accelerator pedal 83.

When the program enters the third drive control routine, the CPU 72 of the hybrid electronic control unit 70 first inputs the required data for control, which include the accelerator opening Acc, the vehicle speed V, the revolution speed Ne of the engine 22, and the revolution speeds Nm1 and Nm2 of the motors MG1 and MG2 (step S300). The CPU 72 then sets the torque demand Tr* to the ring gear shaft 32a or the drive shaft corresponding to the input accelerator opening Acc and vehicle speed V, for example, based on the map of FIG. 3, while summing up the product of the torque demand Tr* and the revolution speed Nr (=Nm2/Gr) of the ring gear shaft 32a, the charge-discharge demand Pb* of the battery 50, and a potential loss to set a target power Pe* to be output from the engine 22 (step S302). The processing of steps S300 and S302 is similar to the processing of steps S100 and S102 in the first drive control routine of FIG. 2.

The CPU 72 subsequently sets the torque and the revolution speed of an efficient drive point of the engine 22, which is selected among drive points fulfilling the target power Pe*, to a target torque Te* and a target revolution speed Ne* of the engine 22 (step S304). The CPU 72 then sets a target revolution speed Nm1* of the motor MG1, based on the setting of the target revolution speed Ne* of the engine 22, the revolution speed Nr (=Nm2/Gr) of the ring gear shaft 32a, and the gear ratio ρ of the power distribution integration mechanism 30 according to Equation (8) given above, while setting a torque command Tm1* of the motor MG1, based on the setting of the target revolution speed Nm1* and the observed current revolution speed Nm1 of the motor MG1 according to Equation (3) given above (step S306). The CPU 72 subsequently sets a torque command Tm2* of the motor MG2, based on the torque demand Tr*, the torque command Tm1* of the motor MG1, the gear ratio ρ of the power distribution integration mechanism 30, and the gear ratio Gr of the reduction gear 35 according to Equation (9) given above (step S308).

The CPU 72 subtracts the product (electric power) of the observed current revolution speed Nm1 and the torque command Tm1* of the motor MG1 and a potential loss from a charge limit Win of the battery 50 and divides the result of the subtraction by the observed current revolution speed Nm2 of the motor MG2, so as to determine a motor torque limit Tm2lim to be output from the motor MG2 (step S310). The torque command Tm2* of the motor MG2 is then compared with the calculated motor torque limit Tm2lim of the motor MG2 (step S312). As both the torque command Tm2* and the motor torque limit Tm2lim of the motor MG2 are negative values, the procedure of step S312 determines whether the absolute value of the torque command Tm2* is not greater than the absolute value of the motor torque limit Tm2lim. When it is determined at step S312 that the torque command Tm2* is less than the motor torque limit Tm2lim, the CPU 72 modifies the torque command Tm1* of the motor MG1, which has been set at step S306, according to Equation (11) given below, in order to cause surplus electric power, which is regenerated by the motor MG2 and exceeds the motor torque limit Tm2lim, to be consumed by the motor MG1 for motoring the engine 22 (step S314). As clearly understood from Equation (11), this process modifies the torque command Tm1* to make the motor MG1 consume surplus electric power corresponding to the difference between the torque command Tm2* and the motor torque limit Tm2lim.

$$Tm1^* \leftarrow Tm1^* + (Tm2lim - Tm2^*) \cdot Nm2/Nm1 \quad (11)$$

The CPU 72 subsequently modifies the target revolution speed Ne* of the engine 22 by reversely calculating Equation (12) given below (step S316). Equation (12) determines the torque command Tm1* to be output from the motor MG1 in feedback control of the motor MG1 to rotate the engine 22 at the target revolution speed Ne*, based on a difference between the setting of the target revolution speed Ne* and the observed current revolution speed Ne of the engine 22. The modified target revolution speed Ne* of the engine 22 here represents the revolution speed of the engine 22 when the engine 22 is motored by the torque output from the motor MG1.

$$Tm1^* = PreviousTm1^* + PID(Ne, Ne^*) \quad (12)$$

After modification of the target revolution speed Ne*, the modified target revolution speed Ne*, that is, the revolution speed of the engine 22 when the engine 22 is motored by the torque output from the motor MG1, is compared with an engine revolution speed limit Nelim, which is specified as an upper limit of allowable revolution speed of the engine 22 (step S318). When it is determined at step S318 that the modified target revolution speed Ne* is higher than the engine revolution speed limit Nelim, the CPU 72 predicts that the revolution speed of the engine 22 exceeds the engine revolution speed limit Nelim, when the motor MG1 motors the engine 22 to the extent of satisfying the charge limit Win of the battery 50. The CPU 72 accordingly re-modifies the torque command Tm1* of the motor MG1 in feedback control of the motor MG1 to rotate the engine 22 at a revolution speed equivalent to the engine revolution speed limit Nelim, according to Equation (13) given below (step S320).

$$Tm1^* - PreviousTm1^* + PID(Ne, Nelim) \quad (13)$$

The CPU 72 subtracts the product (electric power) of the modified torque command Tm1* and the observed current revolution speed Nm1 of the motor MG1, the product (electric power) of the torque command Tm2* and the observed current revolution speed Nm2 of the motor MG2, and a potential loss from the charge limit Win of the battery 50 to determine a surplus electric power exceeding the charge limit Win of the battery 50, and sets the surplus electric power to a power consumption Pair of the air conditioner 90 (step S322).

After the power consumption Pair of the air conditioner 90 is set at step S322, when it is determined at step S312 that the torque command Tm2* of the motor MG2 is not less than the motor torque limit Tm2lim, or when it is determined at step S318 that the target revolution speed Ne* of the engine 22 is not higher than the engine revolution speed limit Nelim, the CPU 72 sends the settings of the target revolution speed Ne* and the target torque Te* of the engine 22 to the engine ECU 24, while sending the settings of the torque command Tm1* and the target revolution speed Nm1* of the motor MG1 and the torque command Tm2* of the motor MG2 to the motor ECU 40 (step S324). In the case of setting the power consumption Pair of the air conditioner at step S322, the CPU 72 forcibly activates the air conditioner 90 with the power consumption Pair, regardless of the on-off state of the air conditioner switch 92 (step S324). The program then exits from this third drive control routine. In the case where motoring of the engine 22 by the motor MG1 fails to use up all the surplus electric power exceeding the charge limit Win of the battery 50, the arrangement of the third embodiment forcibly activates the air conditioner 90, irrespective of the on-off state of the air conditioner switch 92, to consume the residue of the surplus electric power. This desirably ensures application of the required braking force to the ring gear shaft 32a or the drive shaft in response to the driver's accelerator-off action, while effectively preventing the battery 50 from being charged excessively.

As described above, the control of the engine 22 and the motors MG1 and MG2 to output the torque demand Tr*, which is required by the driver's accelerator-off action, to the drive shaft may generate a surplus electric power exceeding the charge limit Win of the battery 50. In such cases, the hybrid vehicle of the third embodiment forcibly activates the air conditioner 90 to consume the surplus electric power exceeding the charge limit Win of the battery 50. This arrangement ensures output of the torque demand Tr* to the ring gear shaft 32a, while effectively preventing the battery 50 from being charged excessively. Namely the hybrid vehicle of the third embodiment desirably prevents the deterioration of drivability, while taking into account the charge limit Win of the battery 50.

In the hybrid vehicle of the third embodiment, the motor MG1 functions to motor the engine 22 and thereby consumes the surplus electric power exceeding the charge limit Win of the battery 50. In the case where the motor MG1 does not manage to use up all the surplus electric power, the air conditioner 90 is forcibly activated to consume the residue of the surplus electric power. One possible modification may forcibly activate the air conditioner 90 to consume all the surplus electric power without controlling the motor MG1 to motor the engine 22.

The hybrid vehicle of the third embodiment forcibly activates the air conditioner 90 to consume the surplus electric power exceeding the charge limit Win of the battery 50. One modified structure may activate any adequate auxiliary machinery other than the air conditioner 90 to consume the surplus electric power, as long as the activation of the auxiliary machinery does not interfere with a smooth drive of the hybrid vehicle.

Figure 7:
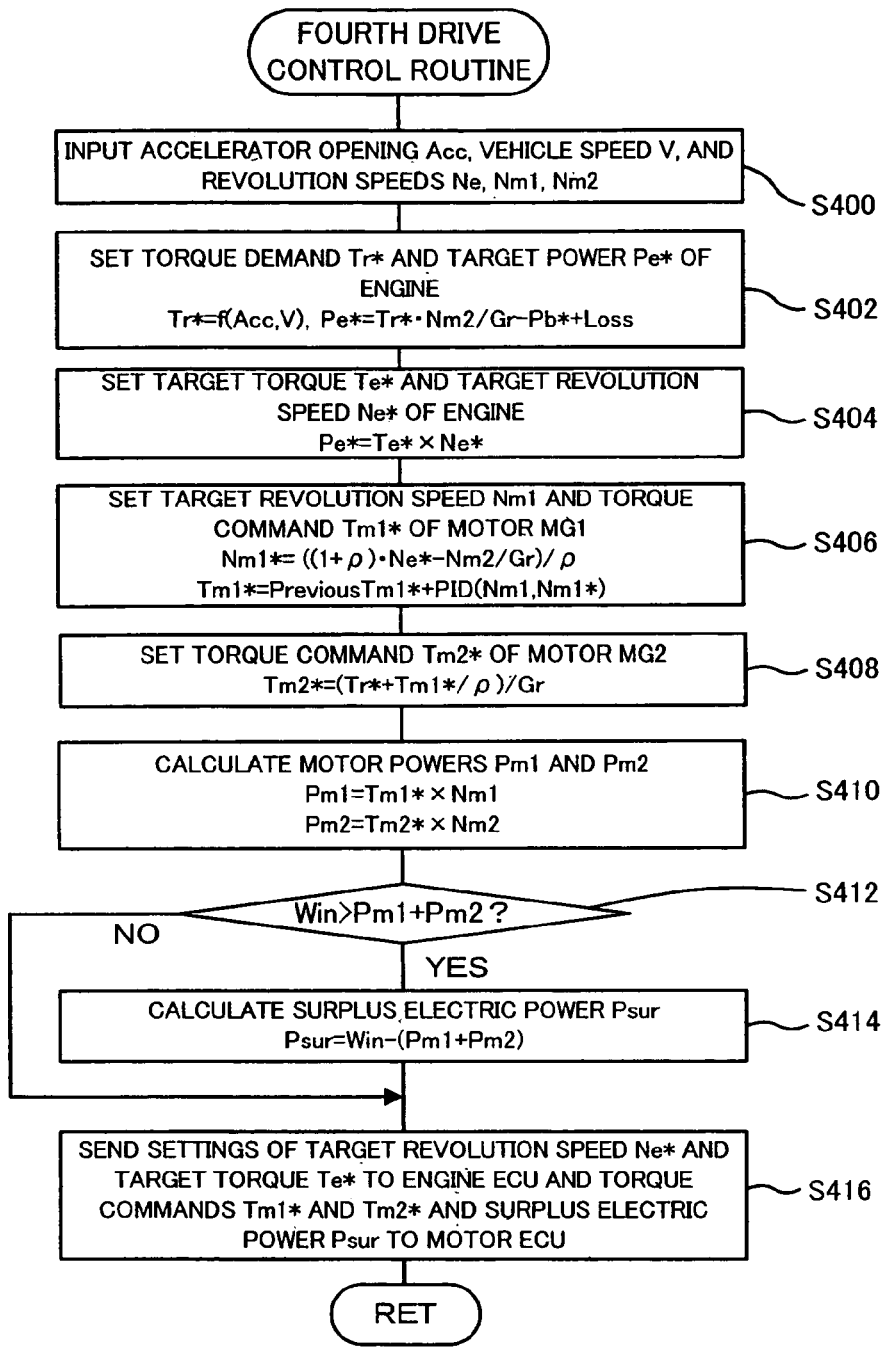
FIG. 7 is a flowchart showing a fourth drive control routine executed by the hybrid electronic control unit 70 in a hybrid vehicle of a fourth embodiment.

The following describes a hybrid vehicle of a fourth embodiment. The hybrid vehicle of the fourth embodiment has the identical construction with that of the hybrid vehicle 20 of the embodiment, except some differences of processing executed by the hybrid electronic control unit 70. The constituents of the hybrid vehicle of the fourth embodiment that are identical with those of the hybrid vehicle 20 of the embodiment are expressed by the same numerals and symbols and are not specifically described here. FIG. 7 is a flowchart showing a fourth drive control routine, which is executed by the hybrid electronic control unit 70 in the hybrid vehicle of the fourth embodiment. This routine is repeatedly executed at preset time intervals (for example, at every 8 msec) when the status of the accelerator pedal 83 is changed from the ON state to the OFF state or when a slip occurs due to spinning of the drive wheels 63a and 63b. The change of the status of the accelerator pedal 83 from the ON state to the OFF state is detected by a comparison between the previous accelerator opening Acc and the current accelerator opening Acc measured by the accelerator pedal position sensor 84. The occurrence of a slip due to spinning of the drive wheels 63a and 63b is detected by a time variation in rotational angular velocity (rotational angular acceleration), which is computed from a rotational angle measured by the rotational position detection sensor 44 attached to the motor MG2 mechanically linked with the drive wheels 63a and 63b.

When the program enters the fourth drive control routine, the CPU 72 of the hybrid electronic control unit 70 first inputs the accelerator opening Acc, the vehicle speed V, the revolution speed Ne of the engine 22, and the revolution speeds Nm1 and Nm2 of the motors MG1 and MG2 (step S400). The CPU 72 then sets the torque demand Tr* to be output to the ring gear shaft 32a corresponding to the input accelerator opening Acc and vehicle speed V, for example, based on the torque demand setting map of FIG. 3, while summing up the product of the torque demand Tr* and the revolution speed Nr (=Nm2/Gr) of the ring gear shaft 32a, the charge-discharge demand Pb* of the battery 50, and a potential loss to set a target power Pe* to be output from the engine 22 (step S402). The CPU 72 subsequently sets the revolution speed and the torque of a most efficient drive point of the engine 22, which is selected among drive points fulfilling the target power Pe*, to a target revolution speed Ne* and a target torque Te* of the engine 22 (step S404).

The CPU 72 then sets a target revolution speed Nm1* of the motor MG1, based on the setting of the target revolution speed Ne* of the engine 22, the revolution speed Nr of the ring gear shaft 32a, and the gear ratio ρ of the power distribution integration mechanism 30 according to Equation (8) given above, while setting a torque command Tm1* of the motor MG1, based on the setting of the target revolution speed Nm1* and the observed current revolution speed Nm1 of the motor MG1 according to Equation (3) given above (step S406). The CPU 72 subsequently sets a torque command Tm2* of the motor MG2, based on the torque demand Tr*, the torque command Tm1* of the motor MG1, the gear ratio ρ of the power distribution integration mechanism 30, and the gear ratio Gr of the reduction gear 35 according to Equation (9) given above (step S408). After setting the torque commands Tm1* and Tm2* of the motors MG1 and MG2, the CPU 72 calculates motor powers Pm1 and Pm2 as powers generated or consumed by the respective motors MG1 and MG2 from the settings of the torque commands Tm1* and Tm2* and the input revolution speeds Nm1 and Nm2 according to Equations (14) and (15) given below (step S410).

$$Pm1 = Tm1^* \times Nm1 \qquad (14)$$

$$Pm2 = Tm2^* \times Nm2 \qquad (15)$$

The sum of the calculated motor powers Pm1 and Pm2 is then compared with the charge limit Win of the battery 50 (step S412). This comparison determines whether the absolute value of the sum of the motor power Pm1 and Pm2 is greater than the absolute value of the charge limit Win of the battery 50. When it is determined that the sum of the motor power Pm1 and Pm2 is not less than the charge limit Win, the CPU 72 determines that there is no surplus electric power and sends the settings of the target revolution speed Ne* and the target torque Te* to the engine ECU 24, while sending the settings of the torque commands Tm1* and Tm2* to the motor ECU 40 (step S416). The program here exits from this fourth drive control routine. When it is determined that the sum of the motor powers Pm1 and Pm2 is less than the charge limit Win, on the other hand, the CPU 72 subtracts the sum of the motor power Pm1 and Pm2 from the charge limit Win to calculate a surplus electric power Psur (step S414) and sends the settings of the target revolution speed Ne* and the target torque Te* to the engine ECU 24, while sending the settings of the torque commands Tm1* and Tm2* and the surplus electric power Psur to the motor ECU 40 (step S416). The program here exits from this fourth drive control routine.

Figure 8:
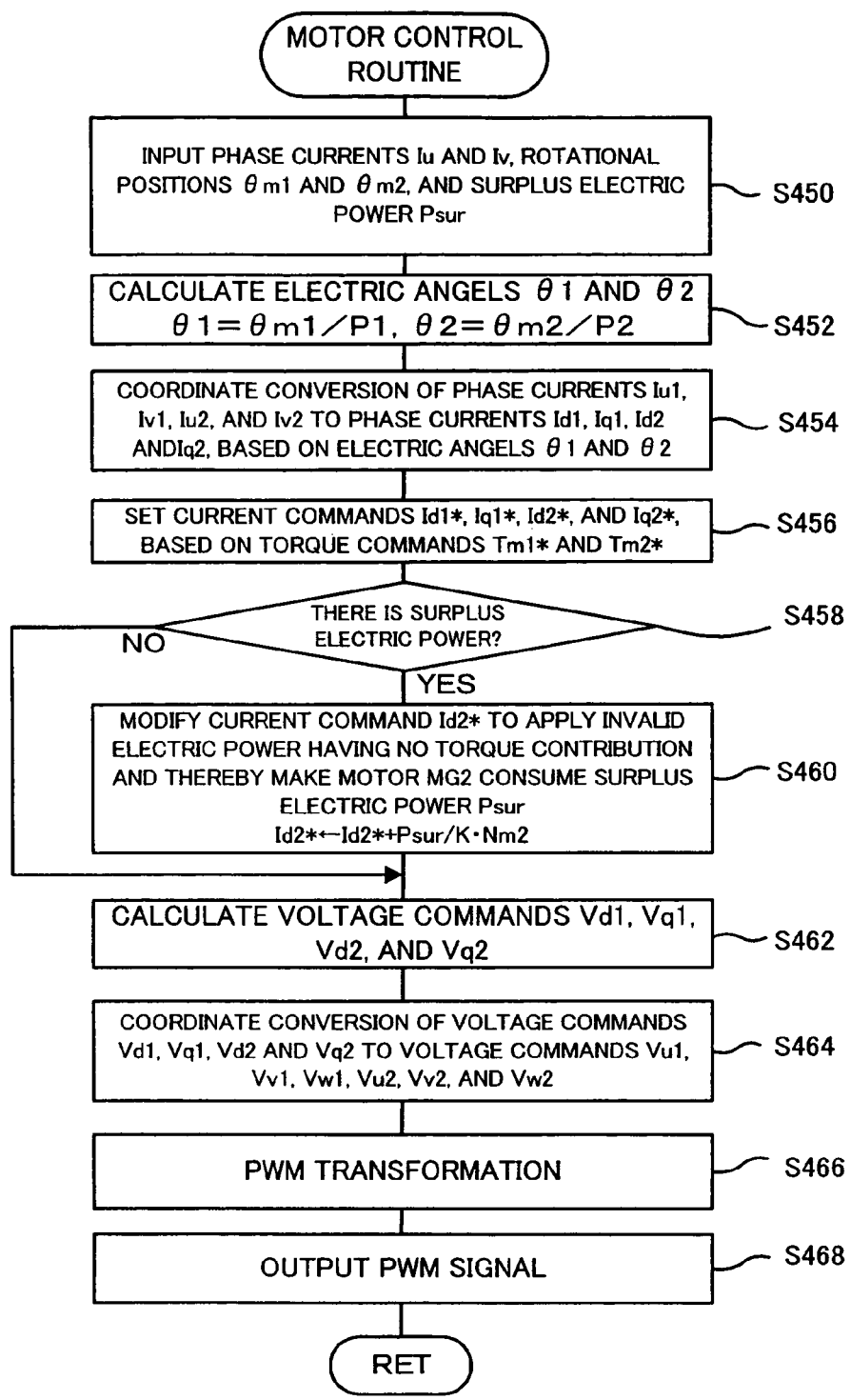
FIG. 8 is a flowchart showing a motor control routine executed by a motor ECU 40.

The motor ECU 40 receives the torque commands Tm1* and Tm2* and the surplus electric power Psur and executes a series of processing discussed below. FIG. 8 is a flowchart showing a motor control routine, which is executed by the motor ECU 40. When the motor control routine starts, the motor ECU 40 first inputs data of phase currents Iu1, Iv1, Iu2, and Iv2 of the motors MG1 and MG2 measured by current sensors (not shown), rotational positions θm1 and θm2 measured by the rotational position detection sensors 43 and 44, and the surplus electric power Psur (step S450). The motor ECU 40 divides the input rotational positions θm1 and θm2 by the numbers of pole pairs P1 and P2 of the motors MG1 and MG2 to calculate electric angles θ1 and θ2 (step S452). The motor ECU 40 subsequently makes the phase currents Iu1, Iv1, Iu2, and Iv2 subjected to coordinate conversion (3 phase-to-2 phase conversion) according to Equations (16) and (17) given below to be converted to values of electric currents Id1, Iq1, Id2, and Iq2 flowing through axes 'd' and 'q' on the assumption that the sum of phase currents flowing through the U phase, the V phase, and the W phase of the three-phase coils of the motor MG1 or MG2 is set equal to 0 (step S454). The motor ECU 40 then sets current commands Id1*, Iq1*, Id2*, and Iq2* of the axes 'd' and 'q' corresponding to the torque commands Tm1* and Tm2* set at steps S406 and S408 in the fourth drive control routine of FIG. 7 (step S456).

$$\begin{bmatrix} Id1 \\ Iq1 \end{bmatrix} = \sqrt{2} \begin{bmatrix} -\sin(\theta 1 - 120) & \sin(\theta 1) \\ -\cos(\theta 1 - 120) & \cos(\theta 1) \end{bmatrix} \begin{bmatrix} Iu1 \\ Iv1 \end{bmatrix} \quad (16)$$

$$\begin{bmatrix} Id2 \\ Iq2 \end{bmatrix} = \sqrt{2} \begin{bmatrix} -\sin(\theta 2 - 120) & \sin(\theta 2) \\ -\cos(\theta 2 - 120) & \cos(\theta 2) \end{bmatrix} \begin{bmatrix} Iu2 \\ Iv2 \end{bmatrix} \quad (17)$$

It is then determined whether there is the surplus electric power Psur (step S458). This decision reflects the result of the determination of whether the sum of the motor powers Pm1 and Pm2 is less than the charge limit Win at step S412 in the fourth drive control routine of FIG. 7. When it is determined that there is no surplus electric power Psur, the motor ECU 40 carries out a standard series of processing and calculates voltage commands Vd1, Vq1, Vd2, and Vq2 of the axes 'd' and 'q' in the motors MG1 and MG2 according to Equations (18) through (21) given below (step S462). In Equations (18) through (21), KPd1, KPq1, KPd2, and KPq2 denote coefficients of proportion and KId1, KIq1, KId2, and KIq2 denote coefficients of integration.

$$Vd1 = KPd1(Id1^* - Id1) + \Sigma KId1(Id1^* - Id1) \quad (18)$$

$$Vq1 = KPq1(Iq1^* - Iq1) + \Sigma KIq1(Iq1^* - Iq1) \quad (19)$$

$$Vd2 = KPd2(Id2^* - Id2) + \Sigma KId2(Id2^* - Id2) \quad (20)$$

$$Vq2 = KPq2(Iq2^* - Iq2) + \Sigma KIq2(Iq2^* - Iq2) \quad (21)$$

The motor ECU 40 makes the voltage commands Vd1, Vq1, Vd2, and Vq2 of the axes 'd' and 'q' subjected to coordinate conversion (3 phase-to-2 phase conversion) according to Equations (22) and (23) given below to be converted to voltage commands Vu1, Vv1, Vw1, Vu2, Vv2, and Vw2, which are to be applied to the U phase, the V phase, and the W phase of the three-phase coils of the motor MG1 or MG2 (step S464). The motor ECU 40 then transforms the voltage commands Vu1, Vv1, Vw1, Vu2, Vv2, and Vw2 into PWM signals for switching control of the inverters 41 and 42 (step S466) and outputs the transformed PWM signals to the inverters 41 and 42, so as to actuate and control the motors MG1 and MG2 (step S468). The motor control routine is here terminated.

$$\begin{bmatrix} Vu1 \\ Vv1 \end{bmatrix} = \sqrt{\frac{2}{3}} \begin{bmatrix} \cos(\theta 1) & -\sin(\theta 1) \\ -\cos(\theta 1 - 120) & -\sin(\theta 1 - 120) \end{bmatrix} \begin{bmatrix} Vd1 \\ Vq1 \end{bmatrix} \quad (22)$$

$$Vw1 = -Vu1 - Vv1$$

$$\begin{bmatrix} Vu2 \\ Vv2 \end{bmatrix} = \sqrt{\frac{2}{3}} \begin{bmatrix} \cos(\theta 2) & -\sin(\theta 2) \\ -\cos(\theta 2 - 120) & -\sin(\theta 2 - 120) \end{bmatrix} \begin{bmatrix} Vd2 \\ Vq2 \end{bmatrix} \quad (23)$$

$$Vw2 = -Vu2 - Vv2$$

When it is determined at step S458 that there is the surplus electric power Psur, on the other hand, the motor ECU 40 specifies the possibility of the battery 50 being excessively charged or being charged with excessive voltage. The motor ECU 40 accordingly modifies the current command Id2* of the motor MG2 set at step S456 according to Equation (24) given below to apply an invalid electric power having no torque contribution and thereby make the motor MG2 consume the surplus electric power Psur (step S460), prior to the actuation and control of the motors MG1 and MG2 at steps S462 through S468. In Equation (24), K denotes a conversion coefficient to the voltage of the motor MG2. This motor control process applies an invalid electric power having no contribution to generation of a torque and thereby makes the motor MG2 consume the surplus electric power, which is not acceptable by the battery 50. This arrangement effectively prevents the battery 50 from being charged excessively or being charged with excess voltage, while keeping the torque command Tm2* of the motor MG2. The procedure of the fourth embodiment modifies only the current command Id2* of the axis 'd'. The current command Iq2* may also be modified to keep the torque command Tm2* by taking into account the potential effects of the modification of the current command Id2* on the magnetic field of the permanent magnets.

$$Id2^* \leftarrow Id2^* + \frac{Psur}{K \cdot Nm2} \quad (24)$$

As described above, when there is the surplus electric power Psur that is unacceptable by the battery 50, the hybrid vehicle of the fourth embodiment applies an invalid electric power having no contribution to generation of a torque onto the motor MG2 and thereby makes the motor MG2 consume the surplus electric power Psur, while keeping the torque command Tm2*. This arrangement effectively prevents the battery 50 from being excessively charged or being charged with excess voltage, while satisfying the torque demand Tr*. The surplus electric power Psur is consumed by the motor MG2, so that no additional device is required for consumption of the surplus electric power Psur.

The hybrid vehicle of the fourth embodiment makes the motor MG2 consume the surplus electric power Psur while keeping the torque command Tm2*. Possible modification may make the motor MG1 consume the surplus electric power Psur while keeping the torque command Tm1*, or may make both the motors MG1 and MG2 consume the surplus electric power Psur while keeping the respective torque commands Tm1* and Tm2*.

Figure 9:
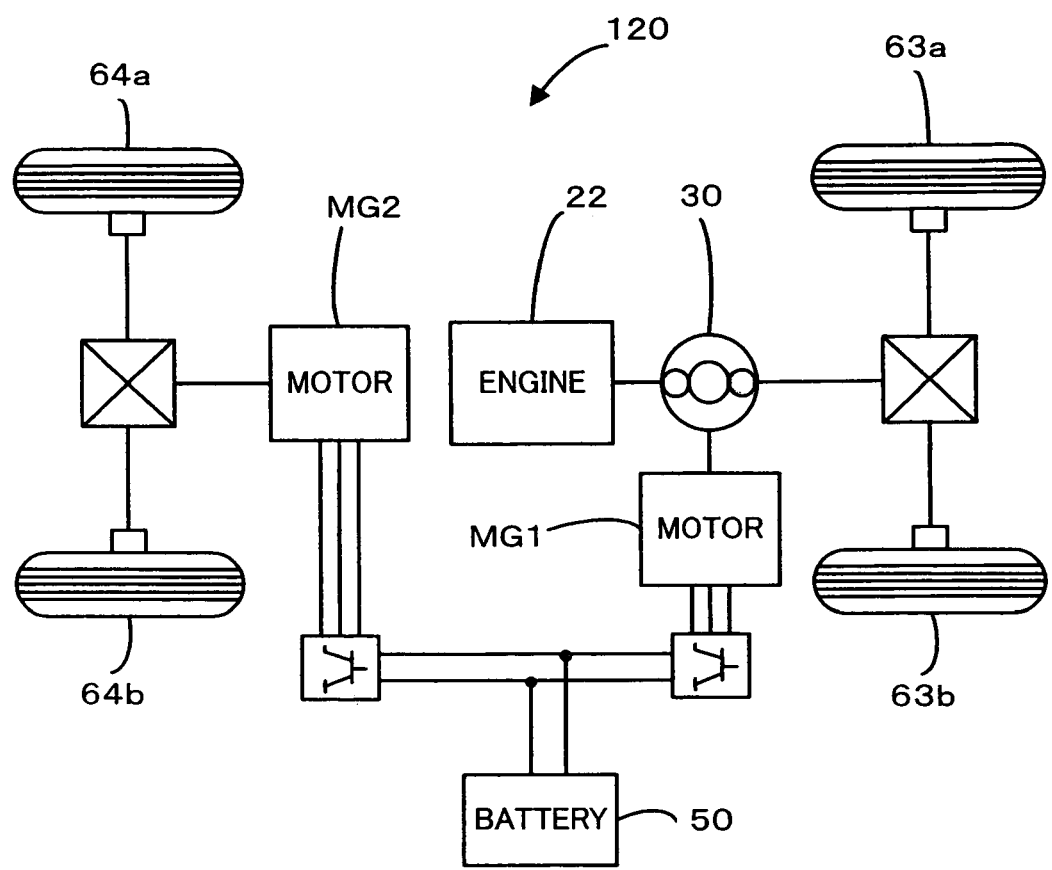
FIG. 9 schematically illustrates the construction of another hybrid vehicle in one modified example.

In the hybrid vehicle 20 of the embodiment and the hybrid vehicles of the second, the third and the fourth embodiments, the power of the motor MG2 is subjected to gear change by the reduction gear 35 and is output to the ring gear shaft 32a. In one possible modification shown as a hybrid vehicle 120 of FIG. 9, the power of the motor MG2 may be output to another axle (that is, an axle linked with wheels 64a and 64b), which is different from an axle connected with the ring gear shaft 32a (that is, an axle linked with the drive wheels 63a and 63b).

Figure 10:
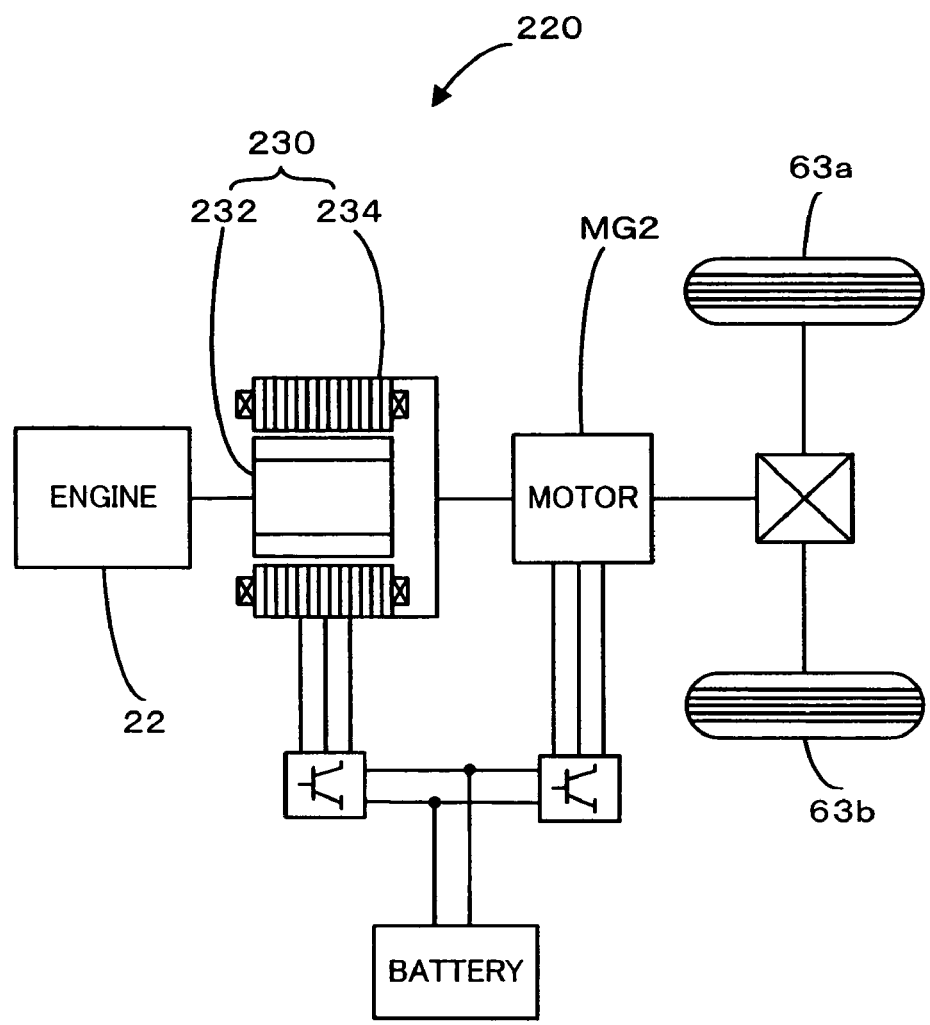
FIG. 10 schematically illustrates the construction of still another hybrid vehicle in another modified example.

In the hybrid vehicle 20 of the embodiment and the hybrid vehicles of the second, the third and the fourth embodiments, the power of the engine 22 is output via the power distribution integration mechanism 30 to the ring gear shaft 32a functioning as the drive shaft linked with the drive wheels 63a and 63b. In another possible modification of FIG. 10, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A power output apparatus that outputs power to a drive shaft, said power output apparatus comprising:
    an internal combustion engine;
    an electric power-dynamic power input-output module that transmits at least part of power from said internal combustion engine to said drive shaft through input and output of electric power and dynamic power;
    a motor that inputs and outputs power from and to said drive shaft;
    an electric accumulator that transmits electric power to and from said electric power-dynamic power input-output module and said motor; and
    a controller that, in response to a driver's accelerator-off action to require a braking force to be delivered to said drive shaft, sets a specific drive point of said internal combustion engine to attain output of a braking force corresponding to the required braking force-and a charge limit of said electric accumulator, specified according to a temperature and a state of charge of said electric accumulator as a maximum electric power during the charge of said electric accumulator, and controls said internal combustion engine, said electric power-dynamic power input-output module, and said motor to drive said internal combustion engine at said specific drive point and to ensure output of the braking force corresponding to the required braking force,
    wherein said controller sets a revolution speed calculated from a first driving force, which is transmitted to said drive shaft through input and output of power into and from said electric power-dynamic power input-output module, to a target revolution speed at the specific drive point of said internal combustion engine, where the first driving force is obtained according to a specific relation that a sum of the first driving force and a second driving force, which is output from said motor to said drive shaft, is equal to the requirement of the braking force and according to another specific relation that a sum of a first electric power input into and output from said electric power-dynamic power input-output module and a second electric power input into and output from said motor, and a potential loss, is equal to the charge limit of said electric accumulator.

2. A power output apparatus that outputs power to a drive shaft, said power output apparatus comprising:
    an internal combustion engine;
    an electric power-dynamic power input-output module that transmits at least part of power from said internal combustion engine to said drive shaft through input and output of electric power and dynamic power;
    a motor that inputs and outputs power from and to said drive shaft;
    an electric accumulator that transmits electric power to and from said electric power-dynamic power input-output module and said motor; and
    a controller that, in response to a driver's accelerator-off action to require a braking force to be delivered to said drive shaft, sets a specific drive point of said internal combustion engine to attain output of a braking force corresponding to the required braking force-and a charge limit of said electric accumulator, specified according to a temperature and a state of charge of said electric accumulator as a maximum electric power during the charge of said electric accumulator, and controls said internal combustion engine, said electric power-dynamic power input-output module, and said motor to drive said internal combustion engine at said specific drive point and to ensure output of the braking force corresponding to the required braking force
    wherein said controller sets a revolution speed calculated from a first driving force, which is transmitted to said drive shaft through input and output of power into and from said electric power-dynamic power input-output module, to a target revolution speed at the specific drive point of said internal combustion engine, where the first driving force is obtained according to a specific relation that a sum of the first driving force and a second driving force, which is output from said motor to said drive shaft, is equal to the requirement of the braking force and according to another specific relation that a sum of a first electric power input into and output from said electric power-dynamic power input-output module and a second electric power input into and output from said motor, and a potential loss, is equal to the charge limit of said electric accumulator,
    wherein said controller substitutes a power input from and output to said electric power-dynamic power input-output module, which is calculated from the first driving force, into a target power of a relational expression, reversely calculates the relational expression to specify a revolution speed, and sets the specified revolution speed to the target revolution speed at the specific drive point of said internal combustion engine, where the relational expression determines a target power to be input from and output to said electric power-dynamic power input-output module in feedback control of said electric power-dynamic power input-output module with the setting of the target revolution speed of said internal combustion engine.

3. A power output apparatus that outputs power to a drive shaft, said power output apparatus comprising:
- an internal combustion engine;
- an electric power-dynamic power input-output module that transmits at least part of power from said internal combustion engine to said drive shaft through input and output of electric power and dynamic power;
- a motor that inputs and outputs power from and to said drive shaft;
- an electric accumulator that transmits electric power to and from said electric power-dynamic power input-output module and said motor; and
- a controller that, in response to a driver's accelerator-off action to require a braking force to said drive shaft, sets a limit braking force as a restriction to the requirement of the braking force by taking into account an increase limit imposed on an increase in revolution speed of said internal combustion engine by input and output of power from and to said electric power-dynamic power input-output module and a charge limit of said electric accumulator, and controls said internal combustion engine, said electric power-dynamic power input-output module, and said motor to ensure output of a braking force corresponding to the requirement of the braking force to said drive shaft under restriction of the setting of the limit braking force.

4. A power output apparatus in accordance with claim 3, wherein said controller calculates a power input from and output to said electric power-dynamic power input-output module to make a revolution speed of said internal combustion engine equal to the increase limit imposed on the increase in revolution speed of said internal combustion engine, sets an output restriction of said motor by taking into account the calculated power input from and output to said electric power-dynamic power input-output module and the charge limit of said electric accumulator, and sets the limit braking force, based on the calculated power input from and output to said electric power-dynamic power input-output module and the setting of the output restriction of said motor.

5. A power output apparatus in accordance with claim 4, wherein said controller sums up a driving force transmitted from said electric power-dynamic power input-output module to said drive shaft corresponding to the calculated power input from and output to said electric power-dynamic power input-output module and a driving force output from said motor to said drive shaft corresponding to the setting of the output restriction, so as to set the limit braking force.

6. A power output apparatus in accordance with claim 3, wherein said electric power-dynamic power input-output module comprises:
- a three-shaft power input-output assembly that is connected with three shafts, that is, an output shaft of said internal combustion engine, said drive shaft, and a third shaft, and specifies input and output of power from and to one residual shaft among said three shafts, based on powers input from and output to two shafts among said three shafts; and
- a generator that inputs and outputs power from and to said third shaft.

7. An automobile that is equipped with a power output apparatus in accordance with claim 3, wherein said drive shaft is mechanically linked with an axle of said automobile.

* * * * *